US006947747B1

(12) United States Patent
Stümpert

(10) Patent No.: US 6,947,747 B1
(45) Date of Patent: Sep. 20, 2005

(54) IMPLEMENTATION OF BASIC CALL SETUP TRANSPORTING LAYER ADDRESS AND LOGICAL POINT IN FORWARD DIRECTION IN CELLULAR NETWORKS WITH SEPARATION OF CALL CONTROL AND BEARER CONTROL

(75) Inventor: Martin Stümpert, Hochspeyer (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 418 days.

(21) Appl. No.: 09/607,790

(22) Filed: Jun. 30, 2000

Related U.S. Application Data

(60) Provisional application No. 60/148,694, filed on Aug. 16, 1999.

(51) Int. Cl.[7] ............................................. H04Q 7/20
(52) U.S. Cl. ................... 455/445; 455/436; 455/432.1; 370/349; 370/338
(58) Field of Search .............................. 455/445, 436, 455/433, 428, 515, 575.1, 550.1, 403, 507.554, 455/554.2, 456.1, 461, 509, 560, 426.1, 456.2, 455/517, 456.5, 426.2, 556.1, 453; 370/229, 370/349, 338, 217, 395.2, 331, 395.3, 351, 370/242, 401, 60, 1, 110.1, 94.3, 395, 3.22, 370/85.11, 385, 352–356, 230, 523, 524, 370/328, 373, 377, 464, 467, 378, 402, 468–474, 370/443, 395.1, 522; 725/74, 78, 81; 379/229, 379/221.05–221.09, 221.1, 221.12

(56) References Cited

U.S. PATENT DOCUMENTS

| | | | | |
|---|---|---|---|---|
| 5,461,669 A | * | 10/1995 | Vilain | ......................... 379/350 |
| 5,878,347 A | * | 3/1999 | Joensuu et al. | ............. 455/433 |
| 5,956,331 A | * | 9/1999 | Rautiola et al. | ............ 370/338 |
| 6,198,936 B1 | * | 3/2001 | Yang et al. | .................. 455/515 |
| 6,208,633 B1 | * | 3/2001 | Jouppila et al. | ............ 370/338 |
| 6,219,546 B1 | * | 4/2001 | Valentine et al. | ........... 455/428 |
| 6,324,279 B1 | * | 11/2001 | Kalmanek, Jr. et al. | .... 379/229 |
| 6,353,607 B1 | * | 3/2002 | Valentine et al. | ........... 370/349 |
| 6,373,817 B1 | * | 4/2002 | Kung et al. | ................. 370/217 |
| 6,490,284 B1 | * | 12/2002 | Graf | ........................ 370/395.2 |
| 6,490,451 B1 | * | 12/2002 | Denman et al. | ............ 455/436 |
| 6,526,581 B1 | * | 2/2003 | Edson | ......................... 725/74 |
| 6,529,490 B1 | * | 3/2003 | Oh et al. | ..................... 370/331 |
| 2003/0202521 A1 | * | 10/2003 | Havinis et al. | ............. 370/401 |
| 2004/0114570 A1 | * | 6/2004 | Vikberg et al. | ............. 370/351 |

FOREIGN PATENT DOCUMENTS

EP     1 039 767 A1     9/2000     ............ H04Q 7/24

OTHER PUBLICATIONS

"The Call Control Protocol in Separated Call and Bearer Envrionment," Knight et al.; BT Technology Journal, GB, BT Laboratories, vol. 16, No. 2, Apr. 1, 1998, pps. 75-86, ISSN: 1358-3948.

* cited by examiner

Primary Examiner—Edward F. Urban
Assistant Examiner—Charles Chow

(57) ABSTRACT

The invention herein relates to implementation of basic call setup for GSM/UMTS core networks, including supplementary services CFU, CFB, CFNREA, CFNRY, CW, HOLD and MPTY, with transporting Media Gateway address and logical point coding and framing information in a forward direction in cellular networks with separation of call control and bearer control. Call setup is described in various traffic cases.

28 Claims, 12 Drawing Sheets

IMPLEMENTATION OF BASIC CALL SETUP TRANSPORTING LAYER ADDRESS AND LOGICAL POINT IN FORWARD DIRECTION IN CELLULAR NETWORKS WITH SEPARATION OF CALL CONTROL AND BEARER CONTROL

CROSS-REFERENCE

This application claims priority on Ser. No. 60/148,694 filed Aug. 16, 1999.

BACKGROUND OF THE INVENTION

A conventional GSM (Global System for Mobile Communications) or UMTS (Universal Mobile Telecommunications Service) core network provides bearer control and call control. The bearer control is the aspect of signaling related to the control of the selection of a path through the transmission network and utilizing (reserving, releasing and setting up) the required resources. The call control is the aspect of signaling related to the subscriber and service control, taking, e.g., the subscriber state into consideration.

In the existing implementations of N-ISDN (Integrated Services Digital Network) the call control and the bearer control are integral with one another. A user plane is associated directly with the control servers, such as MSCs (Mobile Services switching Centers) and GMSCs (Gateway MSCs). Thus, the control nodes implement both application logic for signaling and the user plane.

The present invention is directed to separation of the call control and the bearer control.

SUMMARY OF THE INVENTION

For implementation of GSM and UMTS core networks there is a new approach to separate call control and bearer control.

In accordance with the invention, with the implementation of separation between call and bearer control, the following features are described:

Transfer the MGW address, a termination and possibly the chosen transcoder in a forward direction. With transferring the transcoder in the forward direction TFO (tandem free operation) or TrFO (transcoder free operation) is possible.

The application software is independent from the used transmission technology, e.g. STM, ATM, IP.

Changes to call control and bearer control signaling to achieve the optimized user plane set up.

Usage of logical points in the MGW to allow different control servers to control one MGW.

Giving a MSC, TSC server the possibility to control several MGWs by allocating one PC per MGW in the control node.

The user plane routing for call setup is optimized significantly.

The user plane routing for supplementary services CFN-REA, CFB, CFNRY, CFU is optimized significantly.

The user plane routing for supplementary services CW, HOLD is optimized significantly.

Only one MGW is used if the call stays inside one network or goes over one network border. If the call goes over two network boarders, then two MGWs are involved, each at the edge to the network.

The user plane pipe size is optimized by transferring coded (compressed) user plane to the edge of the network or between two MGWs, e.g. for MPTY calls.

Allowing of pooling of conference call devices in MGWs. Combining different coded speech streams to one MPTY.

Further features and advantages of the invention will be readily apparent from the following specification and the drawings.

DETAILED DESCRIPTION OF THE INVENTION

Figure 1:
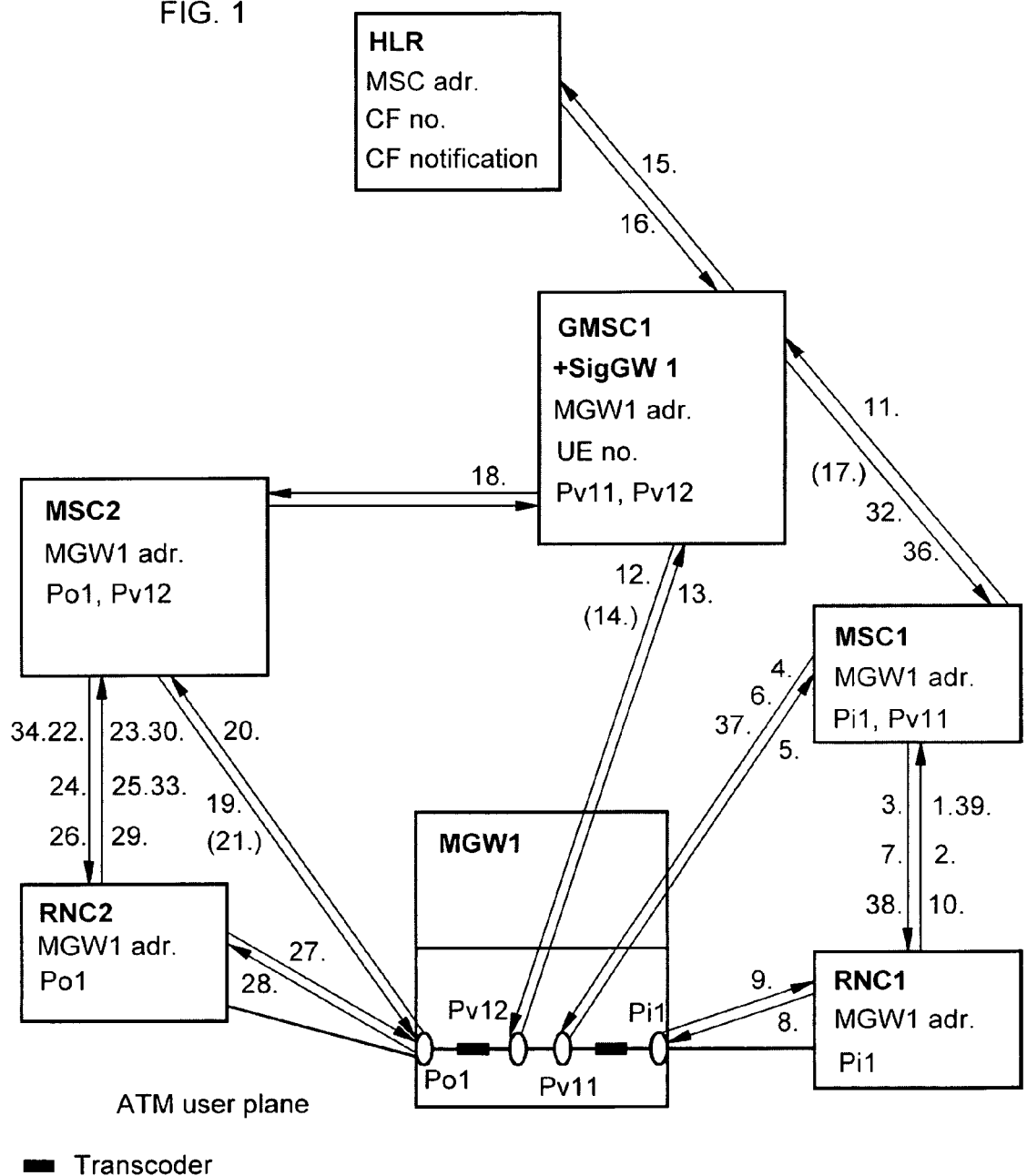
FIG. 1 is a block diagram illustrating basic call setup for a call from UE to UE, MGW address being transported in the forward direction.

The present invention relates to enabling and optimizing call setup in a telecommunication network with separated call control and bearer control, i.e., set up of a payload connection. The separation of call control and payload transmission means that the signaling between control nodes like MSCs, GMSCs and TSCs takes a different way through the network than the payload. This enables the telecommunication network to perform an optimal routing for the payload, using a minimum of resources. Depending on the call case, originating call, terminating call, internal call or transit call, there are only one or maximally two MGW necessary.

The invention particularly relates to a method comprising the transmission of an identification of a selected MGW in a forward direction. That is, the first control node or the second control node selects the MGW depending on:

the call origin;
the call destination (important for the selection of the terminating control node transit switch or MSC, and for the coding decoding); or
the required service (voice, fax or else), for all call cases. In some call cases, further information can be relevant for the selection of an MGW, such as:

the invoked service, e.g. CFB;

the coding of the payload (in the case of compressed voice it is sensible to keep the voice data compressed throughout the network to save transmission capacity); or the framing of the calls.

The invention herein relates to implementation of basic call setup, GSM/UMTS supplementary services CFU, CFB, CFNREA, CFNRY, CW, HOLD and MPTY with transporting a media gateway address, a logical point, the chosen coding type and the chosen framing type in a forward direction in networks with separation of call control and bearer control. Call setup is described in various traffic cases, each illustrated in one of the figures. Each of the figures is a block diagram of a wireless communication system, such as a GSM or UMTS core network, with directional arrows illustrating control signaling between control servers and with MGWs during call setup for the different traffic cases. The written description herein describes information conveyed in each signal. The particular signal is identified herein and in the drawing with a reference numeral.

Many of the calls in the traffic cases described herein involve a mobile terminal or a fixed terminal, for example a fax, a PC, or a phone that is located within the network. Such a mobile terminal is referred to herein as User Equipment (UE). The UE communicates with the network via an RNC (Radio Network Controller) using Radio Resource Control (RRC) protocol.

A logical point is a reference locally generated by a MGW (Media Gateway) and only with the MGW address valid to identify a connection in the control servers e.g. MSC/VLR (MSC/Visitor Location Register), GMSC, TSC and in the RNC. For this purpose a logical point P in a first MGW1 is reserved. This reserved point is sent back in a DCP resource response message to the control server and passed on from this control server to another MGW2 or RNC, which shall set up an AAL2 connection. In this set up the logical point P is included to identify to which reserved resource in a MGW1 the connection shall be set up. The logical point is equivalent to a termination used in the H.GCP protocol standardized by ITU.

A control node, such as one of the control servers, discussed above, provides the application logic. The strict separation of the application logic from the user plane handling allows intensive application development and execution. In the described system the control nodes GMSC, MSC, TSC and HLR (only signaling) exist. The interfaces of the control nodes are, e.g., N-ISUP, for call control signaling, DCP signaling for MGW control and MAP for transferring connectionless signaling between control servers.

A media gateway (MGW) modifies or switches the user plane. It performs operations such as announcement generation, tone generation, echo cancellation, modem handling for data calls, frame handling and CODEC (transcoder) handling for speech calls.

A signaling gateway (GW) performs bearer conversion of signaling messages. In UMTS with an ATM core network and ISDN network interworking a conversion from ATM/AAL5 to MTP is done in the signaling gateway. The signaling GW relays the N-ISUP signaling and exchanges the lower transport layer which is carrying the signaling. Therefore the signaling GW is always collocated with e.g. a GMSC or TSC server.

The backbone network transfers the user plane and the control signaling and can, e.g., be based on STM, ATM or IP. The MGW is the edge node of the backbone network.

The following mnemonics, in addition to others which are well known, are used herein:

AAL2 ATM Adaption Layer Type 2
ATM Asynchronous Transfer Mode
BICC Bearer Independent Call Control
CCD Conference Call Device
CIC Circuit Identity Code
CFB Call Forwarding Busy
CFNREA Call Forwarding Not REAchable
CFNRY Call Forwarding No ReplY
CFU Call Forwarding Unconditional
CM Connection Management
CW Call Waiting Supplementary Service
DCP Device Control Protocol, e.g. X-CP
DPC Destination Point Code
DTAP Direct Transfer Application Part
GMSC Gateway MSC
HLR Home Location Register
HOLD Call Hold Supplementary Service
P Internet Protocol
ISDN Integrated Services Digital Network
ISUP ISDN User Part
MAP Mobile Application Part
MGW Media Gateway
MSC Mobile Services Switching Center
MPTY MultiparTY Supplementary Service
OPC Originating Point Code
PC Point Code
P Logical Point
RANAP Radio Access Network Application Part
RNC Radio Network Controller
SigGW Signaling Gateway
STM Synchronous Transfer Mode
TSC Transit Switching Center
UE User Equipment (mobile)

In the new network architecture described herein, N-ISDN is used for call control, while STM, AAL2 or IP are used for bearer control and usage of the user plane.

The generation of control tones are omitted in this description and shall be handled in other known manners.

The MGW address can be transported on BICC, ISDN e.g., as a sublayer transport address. To find the TSC and/or the MGW address, some IN service, the routing analyse or the B-number analyse are used. The TSC is then chosen for an outgoing call to the ISDN. The MGW is chosen based on capabilities required for handling the call, e.g. which devices such as CODECs, coding, compression, framing scheme, announcement machines, tone senders, or modems are required. In the examples, for simplification, only the B-number analyse is mentioned. The selection depends mainly on the destination. Depending on the destination a group of MGWs with different capabilities can be found. Then a MGW with the needed capabilities, e.g. CCDs, modem support, Internet connectivity is chosen.

All resources which have been reserved by a server have to be released by that server. For simplifying the message flows, described below relative to the Figures, the release of MGW resources is omitted.

In the examples, a one-to-one relation is assumed between the first control node GMSC/TSC server inside the core network and the first MGW inside the CN.

To be able to receive incoming calls over different MGWs, but with the control signaling (IAM) to the same GMSC, the GMSC needs to have one point code per MGW, where the ISDN user plane can terminate. Out of the DPC, to which the IAM was sent, the GMSC can derive the MGW to which the ISDN user plane was set up.

To allow that a TSC controls more than one MGW for outgoing (incoming) traffic the TSC needs one point code per controlled MGW. For a chosen MGW the TSC has to use a certain OPC. Depending on the chosen OPC the transit switch can distinguish the ISDN user planes received from different MGWs.

Another alternative solution to receive or send user plane to different MGWs is that different signaling routes are used between servers, if the user plane is routed via different MGWs.

A third alternative to receive or send user plane to different MGWs from/to a transit switch and control signaling from/to one server is that different CICs are used for different MGWs, if the user plane is routed via different MGWs.

The concept of identifying the originating MGW by OPC used in the IAM message instead of transporting the MGW address in the IAM message, is also possible through the whole CN, but it requires, for a network of m MGWs, m different point codes in each of the the control servers, which can control the MGWs.

Another alternative solution to transfer the knowledge of an MGW from one server to the other is to use different routes for signaling, if the user plane was routed to different MGWs. If a TSC can receive calls from m MGWs, then m different signaling routes towards the RNC are required.

In the following description of the various drawings, various signal names are used. Some of these signals are conventional in nature. The DTAP messages are defined in GSM 04.08 V8.0.0 and UMTS 24.08 V3.0.0. The RANAP messages are defined in UMTS 25.413 V1.0.2. The MAP messages are defined in GSM 09.02 V 6.3.0 and UMTS 29.002 V 3.3.2. The AAL2 messages are used for bearer control in accordance with the invention. The DCP messages, which are particularly described below, are used for communications between control nodes and the MGWs in connection with resource requests and assignments. The ISDN messages are used for signaling between network control nodes and external ISDN networks. An updated ISDN set of messages is to be used between core network servers. Updated is, for example, the IAM message.

FIG. 1 shows a call from one UE to another UE within the network, with an MGW address being transported in a forward direction. In this alternative the originating exchange selects the MGW1, e.g. on traffic and because of location, and transports the MGW1 address in the forward direction with the ISUP IAM message to the GMSC1 and then to the MSC2.

In this case only one MGW is used, which can be used by all control servers to influence the user plane.

A transcoder is linked in by the originating MSC as the termination is not known. On the RNC1 side, the coding negotiated with the UE1 is used and on the outgoing side a default coding is used. The terminating MSC2 chooses the default coding on the one side and the coding, which it negotiated with the UE2 on the side of the RNC2. The following steps in the basic call setup, as with the other examples, below, describe the control signaling in each step and are numbered corresponding to reference numbers in the described figure. The description includes signal protocol, followed by the type of signal.

1. DTAP, CM service request
2. DTAP, Setup
3. DTAP, Call Proceeding
4. DCP, resource request (MGW1)
5. DCP, resource response (Pi1, Pv11)
6. DCP, Through connect (Pv11, Pi1)

The MSC1 commands the MGW1 to backward through connect the incoming point Pi1 and the virtual point Pv11.

7. RANAP, Assignment Request
8. AAL2, Establish Request
9. AAL2, Establish Confirm
10. RANAP, Assignment Response
11. ISDN, Initial Address Message IAM (MGW1, Pv11, OPC, DPC, CIC)

Call setup is requested from the originating MSC1. The MGW1 address and Pv11 or optional the OPC, DPC, CIC can be used for identifying the incoming connection in the GMSC1.

12. DCP, resource request (MGW1, Pv11)
13. DCP, resource response (Pv12)

A virtual point Pv12 is returned from the MGW1.

14. Optional DCP, Through connect (Pv12, Pv11)

The GMSC1 commands the MGW1 to through connect the incoming point Pv12 and the virtual point Pv11. Optionally the whole MGW1 connection can be through connected with one DCP, Through connect (Pi1, Po1) message.

15. MAP, SendRouting information request

The GMSC1 interrogates the HLR for routing information.

16. MAP, SendRouting information response

The GMSC1 receives the forwarding to number and an indication, if a notification shall be given to the calling party.

17. Optional ISDN, Address Complete Message ACM

The ACM message is sent from the GMSC1 to the MSC 1.

18. ISDN, Initial Address Message IAM (MGW1, Pv12, OPC, DPC, CIC) The IAM message is sent from the GMSC1 to the MSC2. The MGW1 address and Pv12 or optional the OPC, DPC, CIC can be used for identifying the incoming connection in the MSC2.

19. DCP, resource request (MGW1, Pv12)

Resources are requested for the call identified by its CIC.

20. DCP, resource response (Po1)

An outgoing point Po1 is returned from the MGW1.

21. DCP, Through connect (Po1, Pv12)

The MSC2 commands the MGW1 to through connect the virtual point Pv12 and the outgoing point Po1. Optionally, the MGW1 connection can be through connected with one DCP, through connect (Pv11, Po1) message.

22. RANAP, Paging
23. DTAP, Paging Response
24. DTAP, Setup
25. DTAP, Call confirmed
26. RANAP, Assignment Request
27. AAL2, Establish Request
28. AAL2, Establish confirm
29. RANAP, Assignment Response
30. DTAP, Alert
31. ISDN, Address Complete Message ACM
32. ISDN, Call Proceeding CPG
33. DTAP, Connect
34. DTAP, Connect ack
35. ISUP, Answer Message ANM
36. ISUP, Answer Message ANM
37. DCP, Through connect (Pv11, Pi1)

The MSC1 commands the MGW1 to through connect the incoming point Pi1 and the virtual point Pv11.

38. DTAP, Connect
39. DTAP, Connect ACK.

Figure 2:
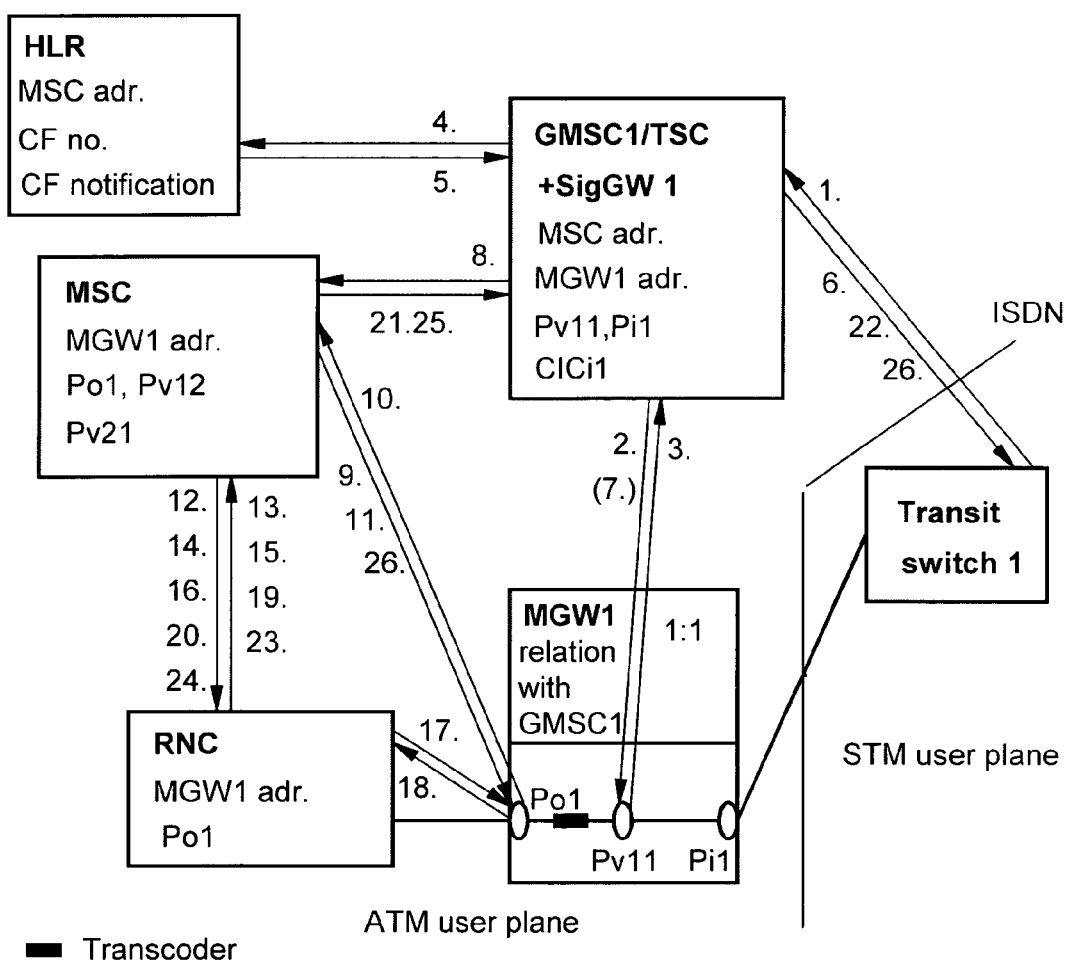
FIG. 2 is a block diagram illustrating basic call setup for a call to UE, MGW address being transported in the forward direction.

FIG. 2 illustrates a call to UE originating outside of the network. The MGW address is again transported in the forward direction. Here a subscriber is calling a served UE1. In this case only one MGW is used, which can be used by all control servers to influence the user plane.

A transcoder is linked in by the terminating MSC. On the incoming side, e.g. PCM coding is used and on the outgoing side the coding, negotiated with the UE1 by the RNC, is used.

Figure 3:
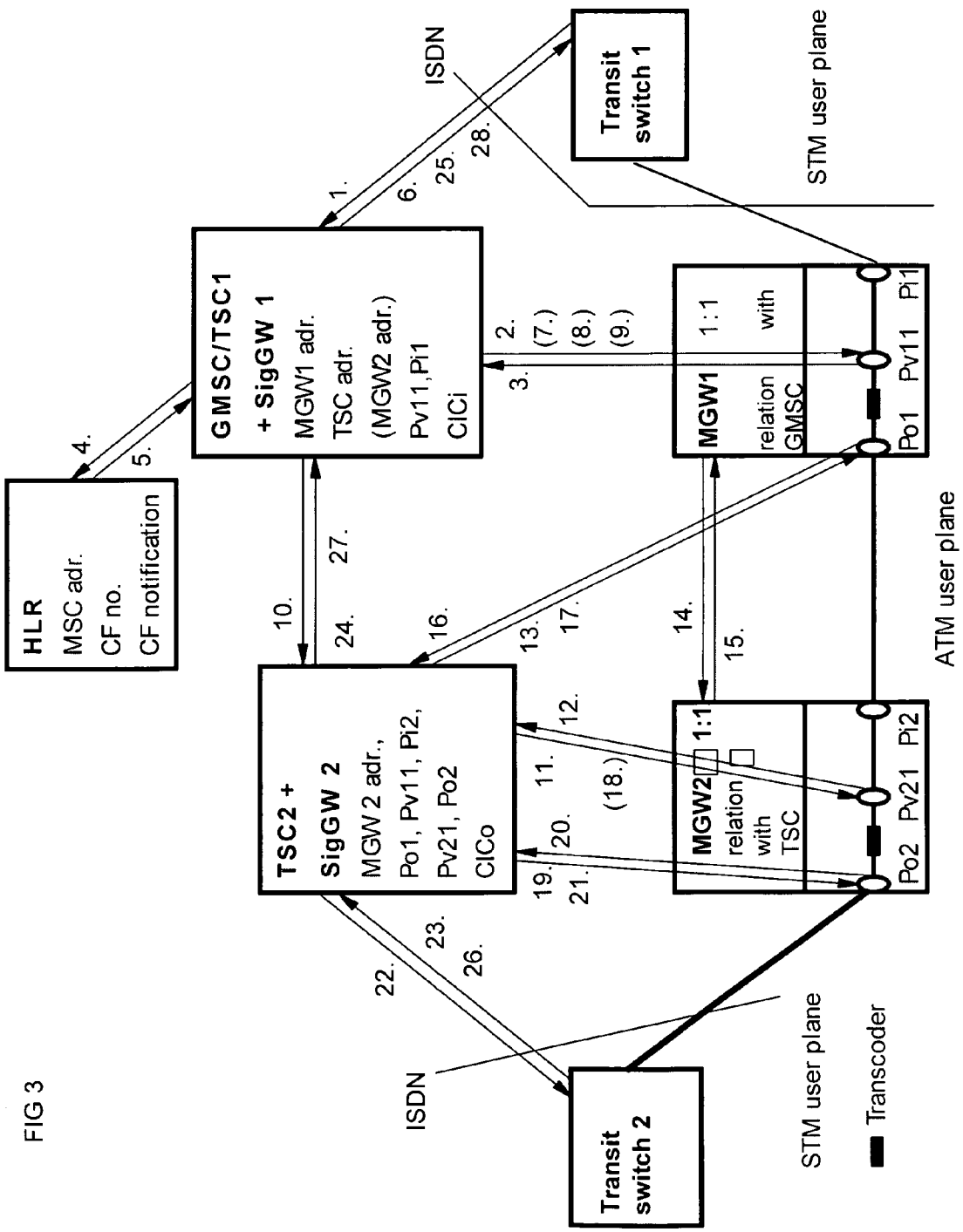
FIG. 3 is a block diagram illustrating basic call setup for call forwarding in GMSC to an ISDN no., MGW address being transported in the forward direction.

1. ISDN, Initial Address Message IAM (OPC, DPC, CIC)
    Call setup is requested from an external ISDN network for a mobile terminated call attempt. In this example the GMSC1/TSC and the Signaling Gateway 1 are collocated.
2. DCP, resource request (MGW1, CIC)
    Resources are requested for the call identified by its CIC, which were chosen by the transit switch of the ISDN network.
3. DCP, resource response (Pi1, Pv11)
    An incoming point Pi1 and a virtual point Pv11 are returned from the MGW1.
4. MAP, SendRouting Information request
    The GMSC1 interrogates the HLR for routing information.
5. MAP, SendRouting Information response
    The GMSC1 receives the MSC address.
6. ISDN, Address Complete Message ACM
    The ACM message is sent from the GMSC1/TSC to the transit switch 1.
7. Optional DCP, Through connect (Pi1, Pv11)
    The GMSC1/TSC commands the MGW1 to through connect the incoming point Pi1 and the virtual point Pv11. Optionally, the whole MGW1 connection can be through connected with one DCP, Through connect (Pi1, Po1) message.
8. ISDN, Initial Address Message IAM (MGW1, Pv11, OPC, DPC, CIC)
    The IAM message is sent from the GMSC1/TSC to the MSC. The MGW1 address and Pv11 or optional the OPC, DPC, CIC can be used for identifying the incoming connection in the MSC.
9. DCP, resource request (MGW1, Pv11)
    Resources are requested for the call identified by its CIC.
10. DCP, resource response (Po1)
    An outgoing point Po1 is returned from the MGW1.
11. DCP, Through connect (Pv11, Po1)
    The MSC commands the MGW1 to through connect the virtual point Pv11 and the outgoing point Po1. Optionally, the whole MGW1 connection can be through connected with one DCP, Through connect (Pi1, Po1) message.
12. RANAP, Paging
13. DTAP, Paging Response
14. DTAP, Setup
15. DTAP, Call confirmed
16. RANAP, Assignment Request
17. AAL2, Establish Request
18. AAL2, Establish confirm
19. RANAP, Assignment Response
20. DTAP, Alert
21. ISDN, Address Complete Message ACM
22. ISDN, Call Proceeding CPG
23. DTAP, Connect
24. DTAP, Connect ack
25. ISUP, Answer Message ANM
26. ISUP, Answer Message ANM FIG. 3 shows a call forwarding in a GMSC to an ISDN subscriber identified by an ISDN no. outside of the network. The MGW address is transported in the forward direction.

For CFNREA in MSC the same handling applies as for CFNREA in GMSC. Therefore only the signaling for CFNREA in GMSC are described below.

Alternatively of TSC2 controlling the setup from MGW1 to MGW2, GMSC can control the setup as the analyse performed in GMSC optional to TSC2 can also deliver the MGW2 address as a one-to-one relation exists between both.

In this case only two MGWs are used, each at the edge of the network.

A transcoder is optionally linked in by the TSC2 in both media gateways MGW1 and MGW2 to compress the transferred user data. On the STM side, e.g. PCM coding is used and on the other side CN default coding is used.

1. ISDN, Initial Address Message IAM (OPC, CPC, CIC)
    Call setup is requested from an external ISDN network for a mobile terminated call attempt. In this example the GMSC and the Signaling Gateway 1 are collocated.
2. DCP, resource request (MGW1, CIC)
    Resources are requested for the call identified by its CIC, which were chosen by the transit switch 1 of the ISDN network.
3. DCP, resource response (Pi1, Pv11)
    An incoming point Pi1 and a virtual point Pv11 are returned from the MGW1.
4. MAP, SendRouting Information request
    The GMSC interrogates the HLR for routing information.
5. MAP, SendRouting Information response
    The GMSC receives the forwarding to number and an indication, if a notification shall be given to the calling party. The forwarded to number received from HLR is analysed and a TSC2 and optional MGW2 address are received from the B-number analyse.
6. ISDN, Address Complete Message ACM
    The ACM message is sent from the GMSC to the transit switch 1. An outband notification can be included in the AM message. This saves signaling, in and out linking of announcement machine and user plane transmission.
7. Optional DCP, Connect announcement machine (Pi1)
    Optional the announcement machine is connected, if inband notification is required.
8. Optional DCP, Disconnect announcement machine (Pi1)
    After the announcement the announcement machine is disconnected.
9. Optional DCP, Through connect (Pi1, Pv11)
    The GMSC commands the MGW1 to through connect the incoming point Pi1 and the virtual point Pv11. Optionally, the whole MGW1 connection can be through connected with one DCP, Through connect (Pi1, Po1) message. This is in line with ITU N-ISDN specifications.
10. ISDN, Initial Address Message IAM (MGW1, PV11, OPC, DPC, CIC)
    The IAM message is sent from the GMSC to the TSC2, which is controlling the MGW2. The MGW1 address and PV11 or optional the OPC, DPC, CIC can be used for identifying the incoming connection in the TSC2.

11. DCP, resource request (MGW2)
   Resources are requested for the call identified by its CIC.
12. DCP, resource response (Pi2, Pv21)
   An incoming point Pi2 and a virtual point Pv21 are returned from the MGW2.
13. DCP, Setup connection (MGW1, MGW2, Pv11, Pi2)
   The TSC2 requests resources for an outgoing call identified by its virtual CIC and commands the MGW1 to set up a connection towards Pi2 in MGW2.
14. AAL2, Establish Request
15. AAL2, Establish confirm
16. DCP, Setup connection response (Po1)
   The MGW1 signals back that the outgoing connection has been set up successfully and returns an outgoing point Po1.
17. DCP, Through connect (Po1, Pv11)
The TSC2 commands the MGW1 to through connect the outgoing point Po1 and the virtual point Pv11. Optionally, the whole MGW1 connection can be through connected with one DCP, Through connect (Pi1, Po1) message.
18. Optional DCP, Through connect (Po1, Pv2)
   The TSC2 commands the MGW2 to through connect the incoming point Pi2 and the virtual point Pv21.
19. DCP, Setup connection (MGW2, Pv21)
The TSC2 requests resources for an outgoing call identified by its virtual CIC and commands the MGW2 to set up a connection toward the transit switch 2.
20. DCP, Setup connection response (Po2, CIC)
   The MGW2 signals back that the outgoing connection has been set up successfully and returns an outgoing point Po2.
21. DCP, Through connect (Po2, Pv21)
   The TSC2 commands the MGW2 to through connect the outgoing point Po2 and the virtual point Pv21.
22. ISDN, Initial Address Message IAM (OPC, DPC, CIC)
   The IAM message is sent from the TSC2 to the transit switch 2.
23. ISDN, Address Complete Message ACM
24. ISDN, Call Proceeding CPG
25. ISDN, Call Proceeding CPG
26. ISDN, Answer Message ANM
27. ISDN, Answer Message ANM
   The ANM message is passed on by the TSC2.
28. ISDN, Answer ANM
   The ANM message is passed on by the GMSC.

Figure 4:
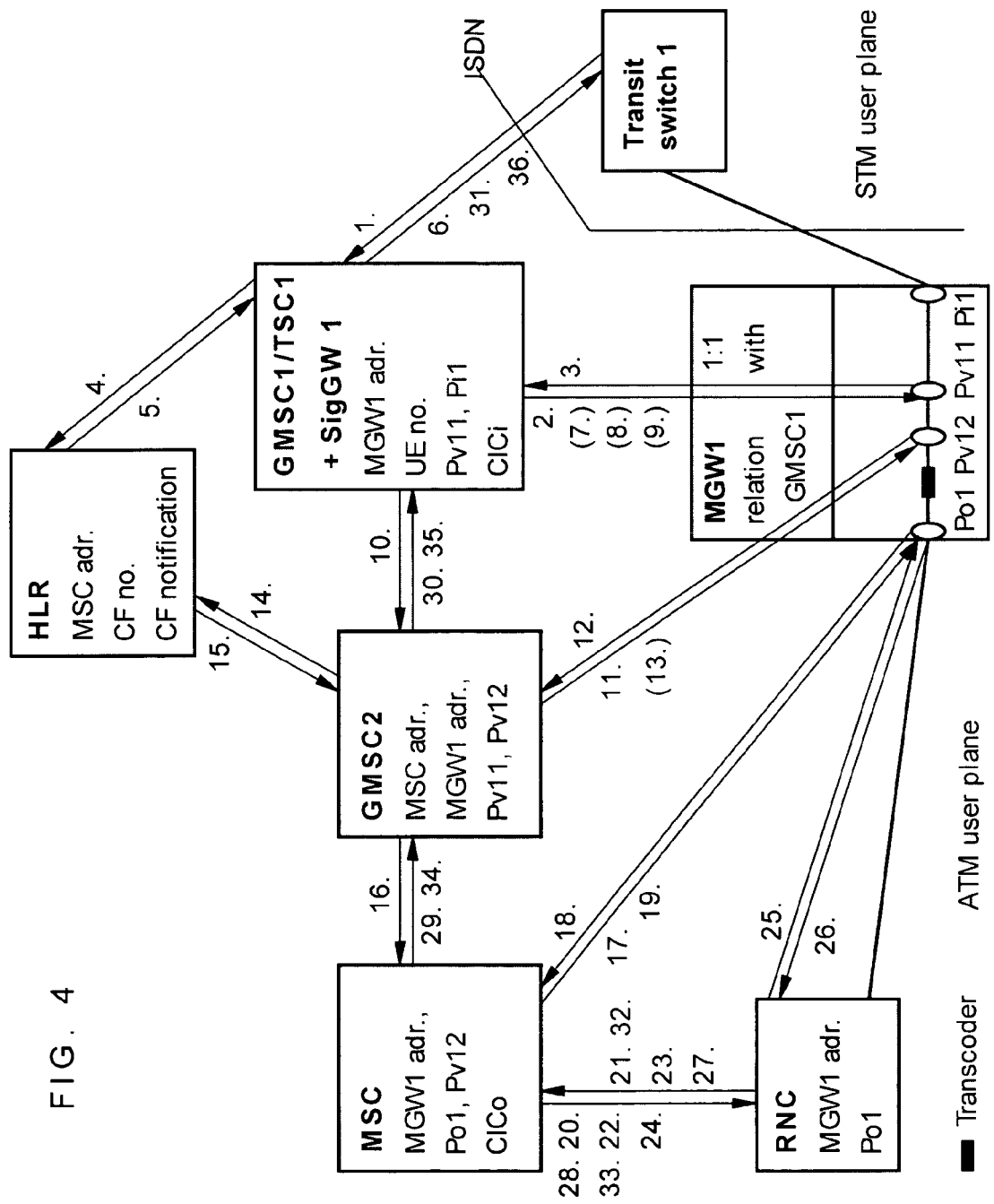
FIG. 4 is a block diagram illustrating basic call setup for call forwarding in GMSC to UE no., MGW address being transported in the forward direction.

FIG. 4 illustrates call forwarding in GMSC to a UE subscriber identified by a UE no. in the network. The MGW address is transported in the forward direction.
   For subsequent forwarding to UE in GMSC instead of GMSC2 several GMSCs have to be included. In this case only one MGW is used, which can be used by all control servers to influence the user plane. A transcoder is linked in by the terminating MSC. On the incoming side, e.g. PCM coding is used and on the outgoing side the coding, negotiated with the UE1, is used.
1. ISDN, Initial Address Message IAM (OPC, DPC, CIC)
   Call setup is requested from an external ISDN network for a mobile terminated call attempt. In this example the GMSC1/TSC1 and the Signaling Gateway 1 are collocated.
2. DCP, resource request (MGW1, CIC)
   Resources are requested for the call identified by its CIC, which were chosen by the transit switch of the ISDN network.
3. DCP, resource response (Pi1, Pv11)
   An incoming point Pi1 and a virtual point Pv11 are returned from the MGW 1.
4. MAP, SendRouting Information request
   The GSMC interrogates the HLR for routing information.
5. MAP, SendRouting Information response
   The GMSC1 receives the forwarding to number and an indication, if a notification shall be given to the calling party.
6. ISDN, Address Complete Message ACM
   The ACM message is sent from the GMSC1/TSC1 to the transit switch 1. An outband notification can be included in the ACM message. This saves signaling, in and out linking of announcement machine and user plane transmission.
7. Optional DCP, Connect announcement machine (Pi2)
   Optionally the announcement machine is connected, if inband notification is required.
8. Optional DCP, Disconnect announcement machine (Pi1)
   After the announcement the announcement machine is disconnected.
9. Optional DCP, Through connect (Pi1, Pv11)
   The GMSC1/TSC1 commands the MGW1 to through connect the incoming point Pi1 and the virtual point Pv11. Optionally, the whole MGW1 connection can be through connected with one DCP, Through connect (Pi1, Po1) message.
10. ISDN, Initial Address Message IAM (MGW1, PV11, OPC, DPC, CIC)
   The IAM message is sent from the GMSC1/TSC1 to the GMSC2. The MGW1 address and Pv11 or optional the OPC, DPC, CIC can be used for identifying the incoming connection in the GMSC2.
11. DCP, resource request (MGW1, Pv11)
   Resources are requested for the call identified by its CIC.
12. DCP, resource response (Pv12)
   A virtual point Pv12 is returned from the MGW1.
13. Optional DCP, Through connect (Pv11, Pv12)
   The GMSC2 commands the MGW1 to through connect the virtual point Pv11 and the virtual point Pv12. Optionally, the whole MGW1 connection can be through connected with one DCP, Through connect (Pi1, Po1) message.
14. MAP, SendRouting Information request
   The GMSC2 receives the MSC address from HLR.
15. MAP, SendRouting Information request
   The GMSC2 receives the MSC address from HLR.
16. ISDN, Initial Address Message IAM (MGW1, PV12, OPC, DPC, CIC)
   The IAM message is sent from the GMSC2 to the MSC.
17. DCP, resource request (MGW1, Pv12)
   Resources are requested for the call identified by its CIC.
18. DCP, resource response (Po1)
An outgoing point Po1 is returned from the MGW1.
19. DCP, Through connect (Po1, Pv12)
The MSC commands the MGW1 to through connect the virtual point Pv12 and the outgoing point Po1. Optionally, the whole MGW1 connection can be through connected with one DCP, Through connect (Pi1, Po1) message.

Figure 5:
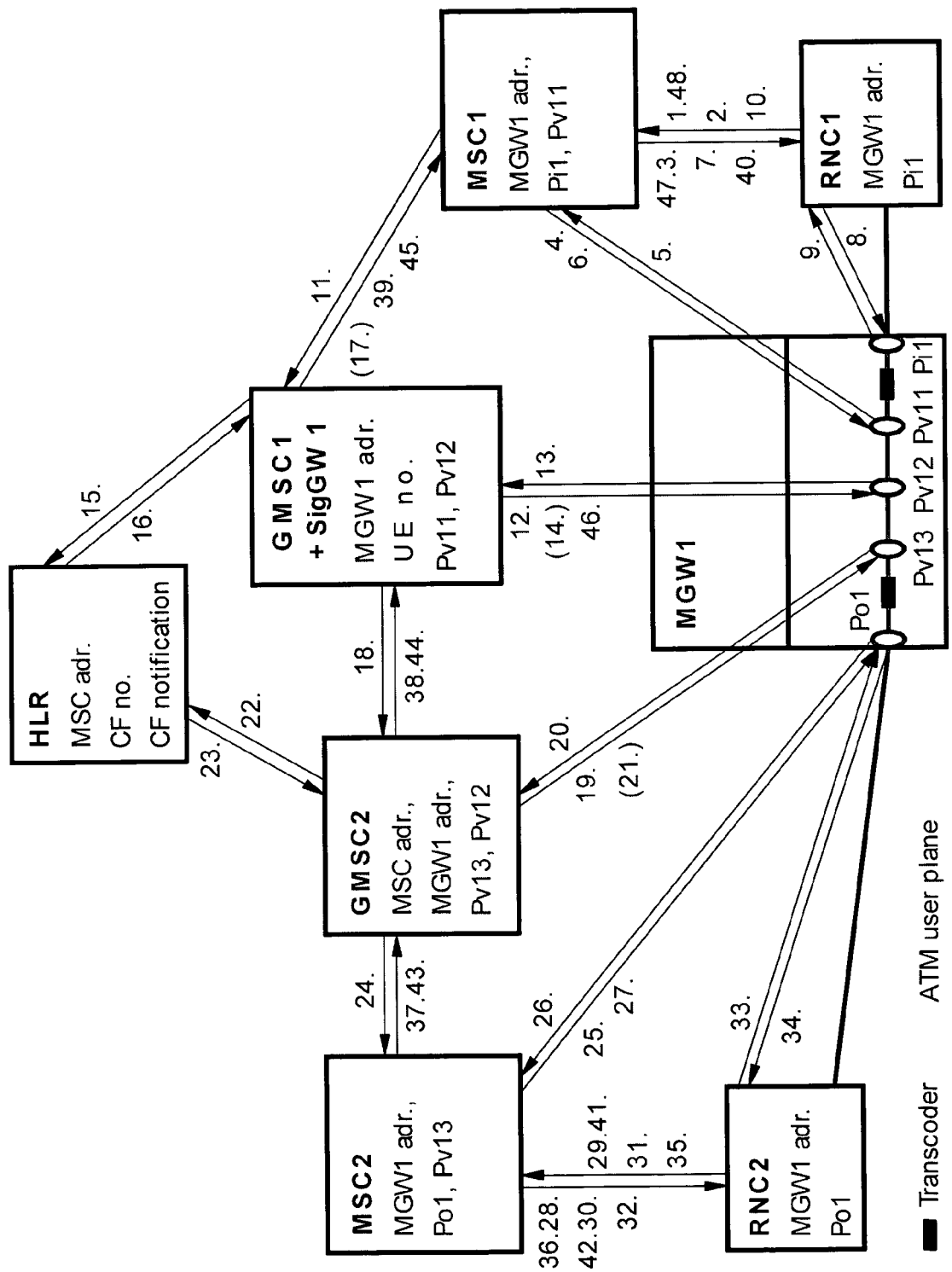
FIG. 5 is a block diagram illustrating basic call setup for a call from UE with call forwarding in GMSC to UE, MGW address being transported in the forward direction.

20. RANAP, Paging
21. DTAP, Paging Response
22. DTAP, Setup
23. DTAP, Call confirmed
24. RANAP, Assignment Request
25. AAL2, Establish Request
26. AAL2, Establish confirm
27. RANAP, Assignment Response
28. DTAP, Alert
29. ISDN, Address Complete Message ACM
30. ISDN, Call Proceeding CPG
31. ISDN, Call Proceeding CPG
32. DTAP, Connect
33. DTAP, Connect ack
34. ISUP, Answer Message ANM
35. ISUP, Answer Message ANM
36. ISUP, Answer Message ANM FIG. 5 illustrates a call from UE with Call forwarding in GMSC to a UE subscriber identified by a UE no. in the network. The MGW address is transported in the forward direction.

There are three alternatives for assuring user plane optimized routing. In the first alternative the MGW1 is chosen in the MSC2. Then the MGW1 address is transferred in the backward direction with ISUP ACM/CPG or some new message to the originating MSC 1. The MSC1 then commands RNC1 to setup the user plane connection towards MGW1 and commands MGW1 to through connect. Then MSC2 commands RNC2 to set up the user plane connection towards MGW1.

The second alternative commands the RNCs to connect without in linking of an MGW and only possible for the mobile to mobile case.

The third alternative is that the originating exchange selects the MGW1 and transports the MGW1 address in the forward direction with the ISUP IAM message to the MSC2. This alternative can be optimized by combining it with the first alternative. So if a MGW address is received in the backward direction, then the MSC1 can perform a subsequent assignment towards RNC 1. Below the third alternative without optimization is described.

For subsequent forwarding to UE in GMSC instead of GMSC2 several GMSCs have to be included. In this case only one MGW is used, which can be used only by all control servers to influence the user plane. A transcoder is linked in by the originating MSC as the termination is not known. On the RNC1 side, the coding is negotiated with the UE1 is used and on the outgoing side a default coding is used. The terminating MSC2 chooses the default coding on the one side and the coding, which it negotiated with the UE2 on the side of RNC2. If only MGW is used that comprises both linked in CODECs, the MGW can decide to link out both CODECs if the coding towards UE1 and UE2 is of the same type.

1. DTAP, CM service request
2. DTAP, Setup
3. DTAP, Call Proceeding
4. DCP, resource request (MGW1)
5. DCP, resource response (Pi1, Pv11)
   An incoming point Pi1 and a virtual point Pv11 are returned from the MGW1.
6. DCP, Through connect (Pv11, Pi1)
   The MSC1 commands the MGW1 to backward through connect the incoming point Pi1 and the virtual point Pv11.
7. RANAP, Assignment Request
8. AAL2, Establish Request
9. AAL2, Establish Confirm
10. RANAP, Assignment Response
11. ISDN, Initial Address Message IAM (MGW1, Pv11, OPC, DPC, CIC)
    Call setup is requested from the originating MSC1. The MGW1 address and Pv11 or optionally the OPC, DPC, CIC can be used for identifying the incoming connection in the GMSC1/TSC.
12. DCP, resource request (MGW1, Pv11)
13. DCP, resource response (Pv12)
    A virtual point Pv12 is returned from the MGW1.
14. Optional DCP, Through connect (Pv12, Pv11)
    The GMSC1 commands the MGW1 to through connect the incoming point Pv12 and the virtual point Pv11. Optionally, the whole MGW1 connection can be through connected with one DCP, Through connect (Pi1, Po1) message.
15. MAP, SendRouting Information request
    The GMSC1 interrogates the HLR for routing information.
16. MAP, SendRouting Information response
    The GMSC1 receives the forwarding to number and an indication, if a notification shall be given to the calling party.
17. Optional ISDN, Address Complete Message ACM
    The ACM message is send from the GMSC1 to the MSC.
18. ISDN, Initial Address Message IAM (MGW1, Pv12, OPC, DPC, CIC)
    The IAM message is send from the GMSC1 to the GMSC2. The MGW1 address and Pv12 or optionally the OPC, DPC, CIC can be used for identifying the incoming connection in the GMSC2.
19. DCP, resource request (MGW1, Pv12)
    Resources are requested for the call identified by its CIC.
20. DCP, resource response (Pv13)
    A virtual point Pv13 is returned from the MGW 1.
21. Optional DCP, Through connect (Pv13, Pv12)
    The GMSC2 commands the MGW1 to through connect the virtual point Pv13 and the virtual point Pv12. Optionally, the MGW1 connection can be through connected with one DCP, Through connect (Pv11, Po1) message.
22. MAP, SendRouting Information request
    The GMSC2 interrogates the HLR for routing information.
23. MAP, SendRouting Information response
    The GMSC2 receives the MSC address from HLR.
24. ISDN, Initial Address Message IAM (MGW1, Pv13, OPC, DPC, CIC)
    The IAM message is sent from the GMSC2 to the MSC.
25. DCP, resource request (MGW1, Pv13)
    Resources are requested for the call identified by its CIC.
26. DCP, resource response (Po1)
    An outgoing point Po1 is returned from the MGW1.
27. DCP, Through connect (Po1, Pv13)
    The MSC2 commands the MGW1 to through connect the virtual point Pv13 and the outgoing point Po1.

Figure 6:
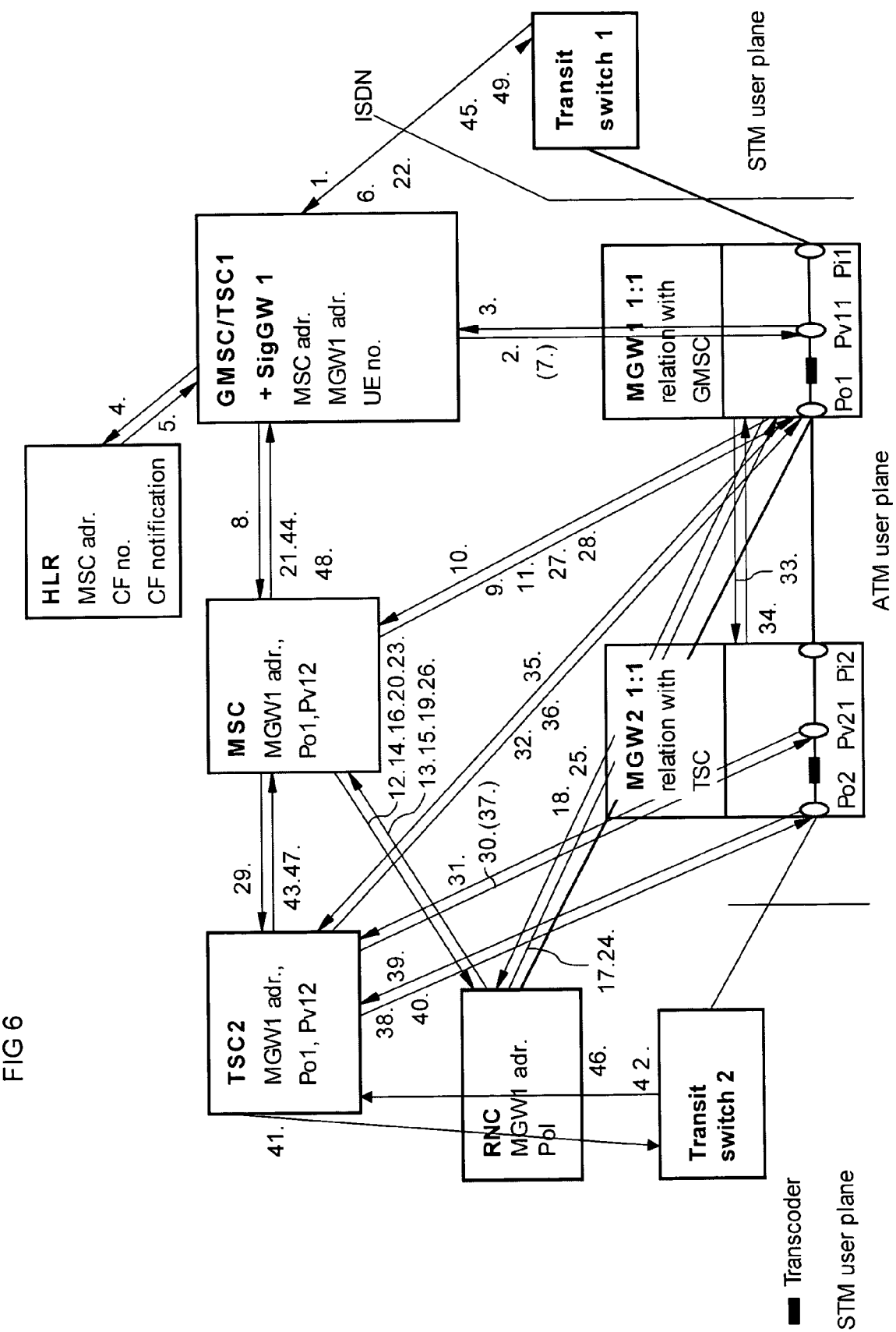
FIG. 6 is a block diagram illustrating basic call setup for call forwarding in MSC to an ISDN number, MGW address being transported in the forward direction.

Optionally, the MGW1 connection can be through connected with one DCP, Through connect (Pv11, Po1) message.
28. RANAP, Paging
29. DTAP, Paging Response
30. DTAP, Setup
31. DTAP, Call confirmed
32. RANAP, Assignment Request
33. AAL2, Establish Request
34. AAL2, Establish confirm
35. RANAP, Assignment Response
36. DTAP, Alert
37. ISDN, Address Complete Message ACM
38. ISDN, Call Proceeding CPG
39. ISDN, Call Proceeding CPG
40. ISDN, Call Proceeding CPG
41. DTAP, Connect
42. DTAP, Connect ack
43. ISUP, Address Complete Message ANM
44. ISUP, Address Complete Message ANM
45. ISUP, Address Complete Message ANM
46. DCP, Through connect (Pv11, Pi1)
    The MSC 1 commands the MGW1 to through connect the incoming point Pi1 and the virtual point Pv11.
47. DTAP, Connect
48. DTAP, Connect ACK FIG. 6 illustrates call forwarding in MSC to an ISDN subscriber identified by an ISDN no. The MGW address is transported in the forward direction.

In this example the conditional call forwarding in MSC is described. The case describes CFNRY, if the UE user does not answer the call, and the call has to be forwarded to an ISDN no. In case of CFNREA, if the UE does not answer the paging, step 12 to 22 have to be omitted. In the current example only two MGWs are used, each at the edge of the network. A transcoder is optionally linked in by the TSC in both media gateways to compress the transferred user data. On the STM side, e.g., PCM coding is used and on the other side CN default coding is used.

1. ISDN, Initial Address Message IAM (OPC, DPC, CIC)
    Call setup is requested from an external ISDN network for a mobile terminated call attempt. In this example the GMSC1/TSC1 and the Signaling Gateway 1 are collocated.
2. DCP, resource request (MGW1, CIC)
    Resources are requested for the call identified by its CIC, which were chosen by the transit switch of the ISDN network.
3. DCP, resource response (Pi1, Pv11)
    An incoming point Pi1 and a virtual point Pv11 are returned from the MGW 1.
4. MAP, SendRouting Information request
    The GMSC1 interrogates the HLR for routing information.
5. MAP, SendRouting Information response
    The GMSC1 receives the MSC address.
6. ISDN, Address Complete Message ACM
    The ACM message is sent from the GMSC to the transit switch 1.
7. Optional DCP, Through connect (Pi1, Pv11)
    The GMSC commands the MGW1 to through connect the incoming point Pi1 and the virtual point Pv11. Optionally, the whole MGW1 connection can be through connected with one DCP, Through connect (Pi1, Po1) message.
8. ISDN, Initial Address Message IAM (MGW1, Pv11, OPC, DPC, CIC)
    The IAM message is sent from the GMSC to the MSC. The MGW1 address and Pv11 or optional the OPC, DPC, CIC can be used for identifying the incoming connection in the MSC.
9. DCP, resource request (MGW1, Pv11)
    Resources are requested for the call identified by its CIC.
10. DCP, resource response (Po1)
    An outgoing point Po1 is returned from the MGW1.
11. DCP, Through connect (Pv11, Po1)
    The MSC commands the MGW1 to through connect the virtual point Pv11 and the outgoing point Po1. Optionally the whole MGW1 connection can be through connected with one DCP, Through connect (Pi1, Po1) message.
12. RANAP, Paging
13. DTAP, Paging Response
14. DTAP, Setup
15. DTAP, Call confirmed
16. RANAP, Assignment Request
17. AAL2, Establish Request
18. AAL2, Establish confirm
19. RANAP, Assignment Response
20. DTAP, Alert
21. ISDN, Address Complete Message ACM
22. ISDN, Call Proceeding CPG
23. RANAP, Iu release command
24. AAL2, Release request
25. AAL2, Release confirm
26. RANAP, Iu release complete
27. Optional DCP, Connect announcement machine (Pv11)
    Optionally, the announcement machine is connected, if inband notification is required.
28. Optional DCP, Disconnect announcement machine (Pv11)
    After the announcement the announcement machine is disconnected.
29. ISDN, Initial Address Message IAM (MGW1, Po1, OPC, DPC, CIC) The IAM message is send from the MSC to the TSC2. The MGW1 address and Pv11 or optionally the OPC, DPC, CIC can be used for identifying the incoming connection in the MSC.
30. DCP, resource request (MGW2)
    Resources are requested for the call identified by its CIC.
31. DCP, resource response (Pi2, Pv21)
    An incoming point Pi2 and a virtual point Pv21 are returned from the MGW2.
32. DCP, Setup connection (MGW1, MGW2, Po1, Pi2)
    The TSC2 requests the already reserved resources for an outgoing call identified by its virtual CIC and commands the MGW1 to set up a connection towards Pi2 in MGW2.
33. AAL2, Establish Request
34. AAL2, Establish confirm
35. DCP, Setup connection response (Po1)
    The MGW1 signals back that the outgoing connection has been set up successful and returns an outgoing point Po1.
36. DCP, Through connect (Po1, Pv11)
    The TSC2 commands the MGW1 to through connect the outgoing point Po1 and the virtual point Pv11. If optional DCP, Through connect (Pi2, Pv11) is omitted, instead of Pv11 Pi1 must be used.

Figure 7:
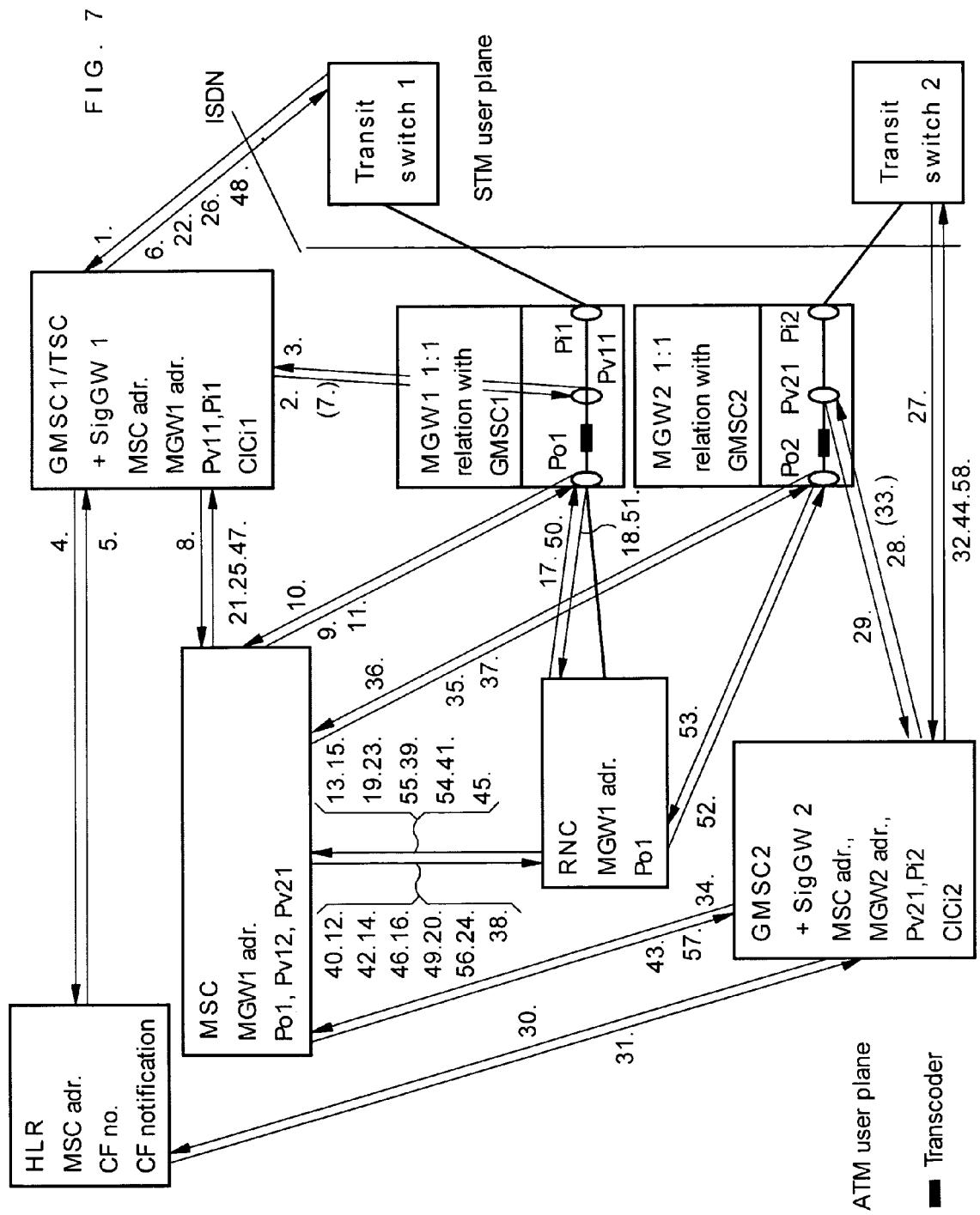
FIG. 7 is a block diagram illustrating basic call setup for call waiting and accepting the waiting call in different MGWs, MGW address being transported in the forward direction.

37. Optional DCP, Through connect (Pi2, Pv21)
   The TSC2 commands the MGW2 to through connect the incoming point Pi2 and the virtual point Pv21.
38. DCP, Setup connection (MGW2, Pv21)
   The TSC2 requests resources for an outgoing call identified by its virtual CIC and commands the MGW2 to set up a connection towards the transit switch 2.
39. DCP, Setup connection response (Po2, CIC)
   The MGW2 signals back that the outgoing connection has been set up successfully and returns an outgoing point Po2.
40. DCP, Through connection (Po2, Pv21)
   The TSC2 commands the MGW2 to through connect the outgoing point Po2 and the virtual point Pv21.
41. ISDN, Initial Address Message IAM (OPC, DPC, CIC)
   The IAM message is send from the TSC2 to the transit switch 2.
42. ISDN, Address Complete Message ACM
43. ISDN, Call Proceeding CPG
44. ISDN, Call Proceeding CPG
45. ISDN, Call Proceeding CPG
46. ISDN, Answer Message ANM
47. ISDN, Answer Message ANM
48. ISDN, Answer Message ANM
49. ISDN, Answer Message ANM FIG. 7 illustrates call waiting and accepting the waiting call in different MGWs. The MGW address is transported in the forward direction.

Here a subscriber B is calling a served UE A, who has the supplementary services CW and HOLD. After the call from B to A is active another terminating call from a subscriber C to A is received. Subscriber A accepts the waiting call from C and therefore has to put the call to B on hold. The user plane is routed directly to the MGW of the active call. This is the optimal way for the transmission, but it requires subsequent assignment over the Iu interface.

In this case only one MGW is used for each call, which can be used by all control servers to influence the user plane. No user plane connection is needed between the MGWs.

1. ISDN, Initial Address Message IAM (OPC, DPC, CIC)
   Call setup is requested from an external ISDN network for a mobile terminated call attempt. In this example the GMSC1/TSC and the Signaling Gateway 1 are collocated.
2. DCP, resource request (MGW1, CIC)
   Resources are requested for the call identified by its CIC, which were chosen by the transit switch of the ISDN network.
3. DCP, resource response (Pi1, Pv11)
   An incoming point Pi1 and a virtual point Pv11 are returned from the MGW 1.
4. MAP, SendRouting Information request
   The GMSC1 interrogates the HLR for routing information.
5. MAP, SendRouting Information response
   The GMSC1 receives the MSC address.
6. ISDN, Address Complete Message ACM
   The ACM message is sent from the GMSC1/TSC to the transit switch 1.
7. Optional DCP, Through connect (Pi1, Pv11)
   The GMSC1/TSC commands the MGW1 to through connect the incoming point Pi1 and the virtual point Pv11. Optionally the whole MGW1 connection can be through connected with one DCP, Through connect (Pi1, Po1) message.
8. ISDN, Initial Address Message IAM (MGW1, Pv11, OPC, DPC, CIC)
   The IAM message is sent from the GMSC1/TSC to the MSC. The MGW1 address and Pv11 or optionally the OPC, DPC, CIC can be used for identifying the incoming connection in the MSC.
9. DCP, resource request (MGW1, Pv11)
   Resources are requested for the call identified by its CIC.
10. DCP, resource response (Po1)
    An outgoing point Po1 is returned from the MGW1.
11. DCP, Through connect (Pv11, Po1)
    The MSC commands the MGW1 to through connect the virtual point Pv11 and the outgoing point Po1. Optionally the whole MGW1 connection can be through connected with one DCP, Through connect (Pi1, Po1) message.
12. RANAP, Paging
13. DTAP, Paging Response
14. DTAP, Setup
15. DTAP, Call confirmed
16. RANAP, Assignment Request
17. AAL2, Establish Request
18. AAL2, Establish confirm
19. RANAP, Assignment Response
20. DTAP, Alert
21. ISDN, Address Complete Message ACM
22. ISDN, Call Proceeding CPG
23. DTAP, Connect
24. DTAP, Connect ack
25. ISUP, Answer Message ANM
26. ISUP, Answer Message ANM
27. ISDN, Initial Address Message IAM (OPC, DPC, CIC)
    Call setup is requested from an external ISDN network for a mobile terminated call attempt. In this example the GMSC2 and the Signaling Gateway 2 are collocated.
28. DCP, resource request (MGW2, CIC)
    Resources are requested for the call identified by its CIC, which were chosen by the transit switch 2 of the ISDN network.
29. DCP, resource response (Pi2, Pv11)
    An incoming point Pi2 and a virtual point Pv21 are returned from the MGW2.
30. MAP, SendRouting Information request
    The GMSC2 interrogates the HLR for routing information.
31. MAP, SendRouting Information response
    The GMSC2 receives the MSC address.
32. ISDN, Address Complete Message ACM
    The ACM message is send from the GMSC2 to the transit switch 2.
33. Optional DCP, Through connect (Pi2, Pv21)
    The GMSC2 commands the MGW2 to through connect the incoming point Pi2 and the virtual point Pv21. Optionally, the whole MGW2 connection can be through connected with one DCP, Through connect (Pi2, Po2) message.
34. ISDN, Initial Address Message IAM (MGW2, Pv21, OPC, DPC, CIC)
    The IAM message is sent from the GMSC2 to the MSC. The MGW2 address and Pv21 or optionally the OPC, DPC, CIC can be used for identifying the incoming connection in the MSC.

Figure 8:
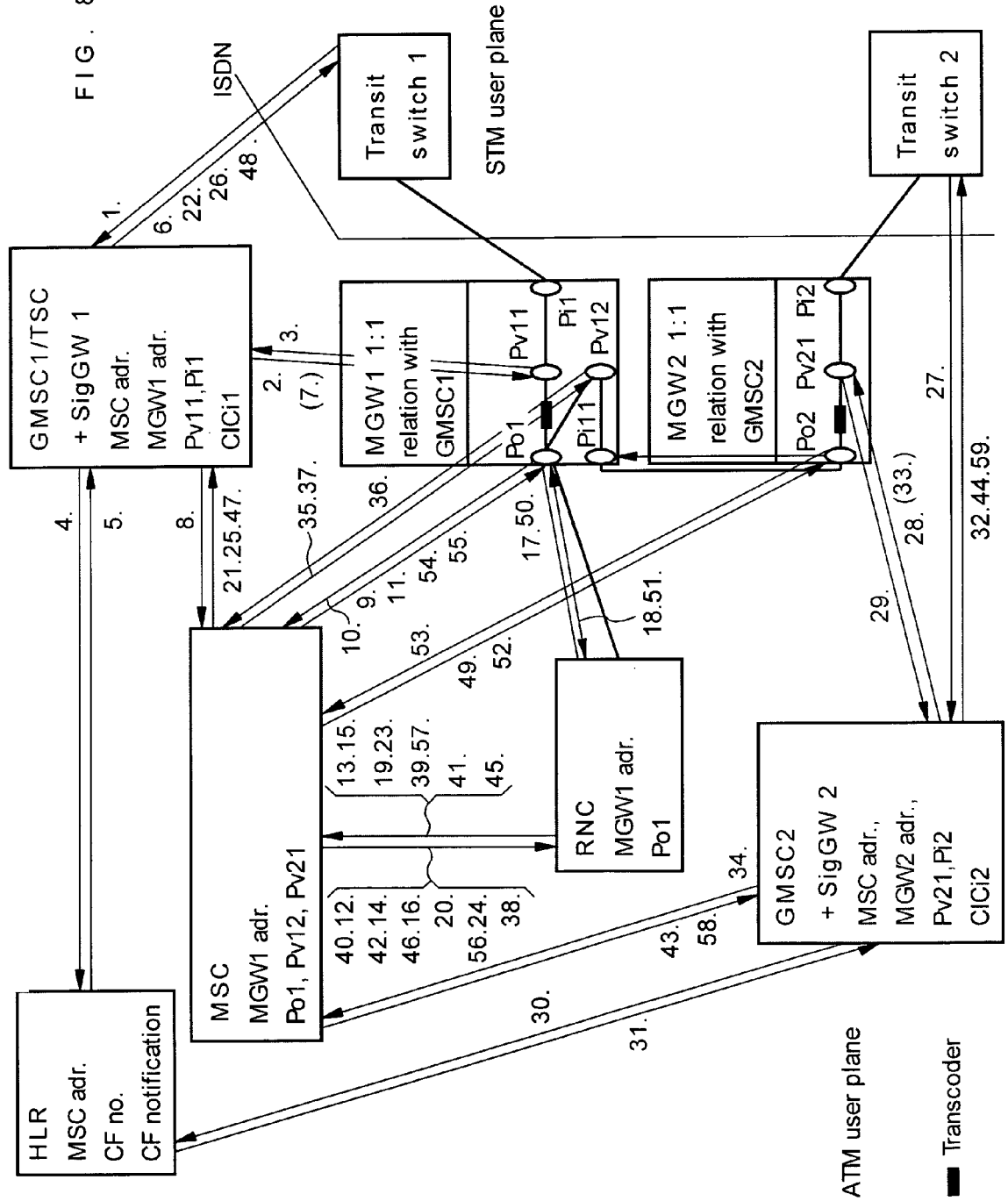
FIG. 8 is a block diagram illustrating basic call setup for call waiting and accepting the waiting call in one MGW, MGW address being transported in the forward direction.

35. DCP, resource request (MGW2, Pv21)
   Resources are requested for the call identified by its CIC.
36. DCP, resource response (Po2)
   An outgoing point Po2 is returned from the MGW2.
37. DCP, Through connect (Pv21, Po1)
   The MSC commands the MGW2 to through connect the virtual point Pv21 and the outgoing point Po2. Optionally, the whole MGW2 connection can be through connected with one DCP, Through connect (Pi2, Po2) message.
38. RANAP, Paging
39. DTAP, Paging Response
40. DTAP, Setup
41. DTAP, Call confirmed
42. DTAP, Alert
43. ISDN, Address Complete Message ACM
44. ISDN, Call Proceeding CPG
45. DTAP, HOLD (B)
46. DTAP, HOLD ACK
47. ISUP, Call Proceeding Message CPG (B held)
48. ISUP, Call Proceeding Message CPG (B held)
49. RANAP, Assignment Request
50. AAL2, Release Request
51. AAL2, Release Confirm
52. AAL2, Establish Request
53. AAL2, Establish confirm
54. RANAP, Assignment Response
55. DTAP, Connect
56. DTAP, Connect ack
57. ISUP, Answer Message ANM
58. ISUP, Answer Message ANM FIG. 8 illustrates call waiting and accepting the waiting call in one MGW. The MGW address is transported in the forward direction.

Here a subscriber B is calling a served mobile subscriber A, who has the supplementary services CW and HOLD. After the call from B to A is active another terminating call from a subscriber C over MGW2 to A is received. Subscriber A accepts the waiting call from C and therefore has to put the call to B on hold. The user plane is routed from MGW2 to the MGW1 of the first active call. The active call becomes then the held call. It is assumed that both the active and the waiting call use the same service, e.g., speech, so that the AAL2 connection between RNC and MGW1 can be reused. This allows fast switches between the active and the held call and if a multiparty is required later on, only a conference call device has to be linked in the MGW1.

In this case only one MGW is used for each call, which can be used by all control servers to influence the user plane. The user plane connections are gathered at one MGW. This allows faster switches between the calls from B and C. A transcoder is linked in by the terminating MSC for each call. On the incoming side, e.g., PCM coding is used and on the outgoing side the coding, negotiated with the UEs, is used.

1. ISDN, Initial Address Message IAM (OPC, DPC, CIC)
   Call setup is requested from an external ISDN network for a mobile terminal call attempt. In this example the GMSC1/TSC and the Signaling Gateway 1 are collocated.
2. DCP, resource request (MGW1, CIC)
   Resources are requested for the call identified by its CIC, which were chosen by the transit switch of the ISDN network.
3. DCP, resource response (Pi2, Pv11)
   An incoming point Pi1 and a virtual point Pv11 are returned from the MGW 1.
4. MAP, SendRouting Information request
   The GMSC1 interrogates the HLR for routing information.
5. MAP, SendRouting Information response
   The GMSC1 receives the MSC address.
6. ISDN, Address Complete Message ACM
   The ACM message is send from the GMSC1/TSC to the transit switch 1.
7. Optional DCP, Through connect (Pi1, Pv11)
   The GMSC1/TSC commands the MGW1 to through connect the incoming point Pi1 and the virtual point Pv11. Optionally, the whole MGW1 connection can be through connected with one DCP, Through connect (Pi2, Po2) message.
8. ISDN, Initial Address Message IAM (MGW1, Pv11, OPC, DPC, CIC)
   The IAM message is sent from the GMSC1/TSC to the MSC. The MGW1 address and Pv11 or optional the OPC, DPC, CIC can be used for identifying the incoming connection in the MSC.
9. DCP, resource request (MGW1, Pv11)
   Resources are requested for the call identified by its CIC.
10. DCP, resource response (Po1)
    An outgoing point Po1 is returned from the MGW 1.
11. DCP, Through connect (Pv11, Po1)
    The MSC commands the MGW1 to through connect the virtual point Pv11 and the outgoing point Po1. Optionally, the whole MGW1 connection can be through connected with one DCP, Through connect (Pi1, Po1) message.
12. RANAP, Paging
13. DTAP, Paging Response
14. DTAP, Setup
15. DTAP, Call confirmed
16. RANAP, Assignment Request
17. AAL2, Establish Request
18. AAL2, Establish confirm
19. RANAP, Assignment Response
20. DTAP, Alert
21. ISDN, Address Complete Message ACM
22. ISDN, Call Proceeding CPG
23. DTAP, Connect
24. DTAP, Connect ack
25. ISUP, Answer Message ANM
26. ISUP, Answer Message ANM
27. ISDN, Initial Address Message IAM (OPC, DPC, CIC)
    Call setup is requested from an external ISDN network for a mobile terminated call attempt. In this example the GMSC2 and the Signaling Gateway 2 are collocated.
28. DCP, resource request (MGW2, CIC)
    Resources are requested for the call identified by its CIC, which were chosen by the transit switch 2 of the ISDN network.
29. DCP, resource response (Pi2, Pv11)
    An incoming point Pi2 and a virtual point Pv21 are returned from the MGW2.
30. MAP, SendRouting Information request
    The GMSC2 interrogates the HLR for routing information.
31. MAP, SendRouting Information response
    The GMSC2 receives the MSC address.
32. ISDN, Address complete Message ACM
    The ACM message is send from the GMSC2 to the transit switch 2.

Figure 9:
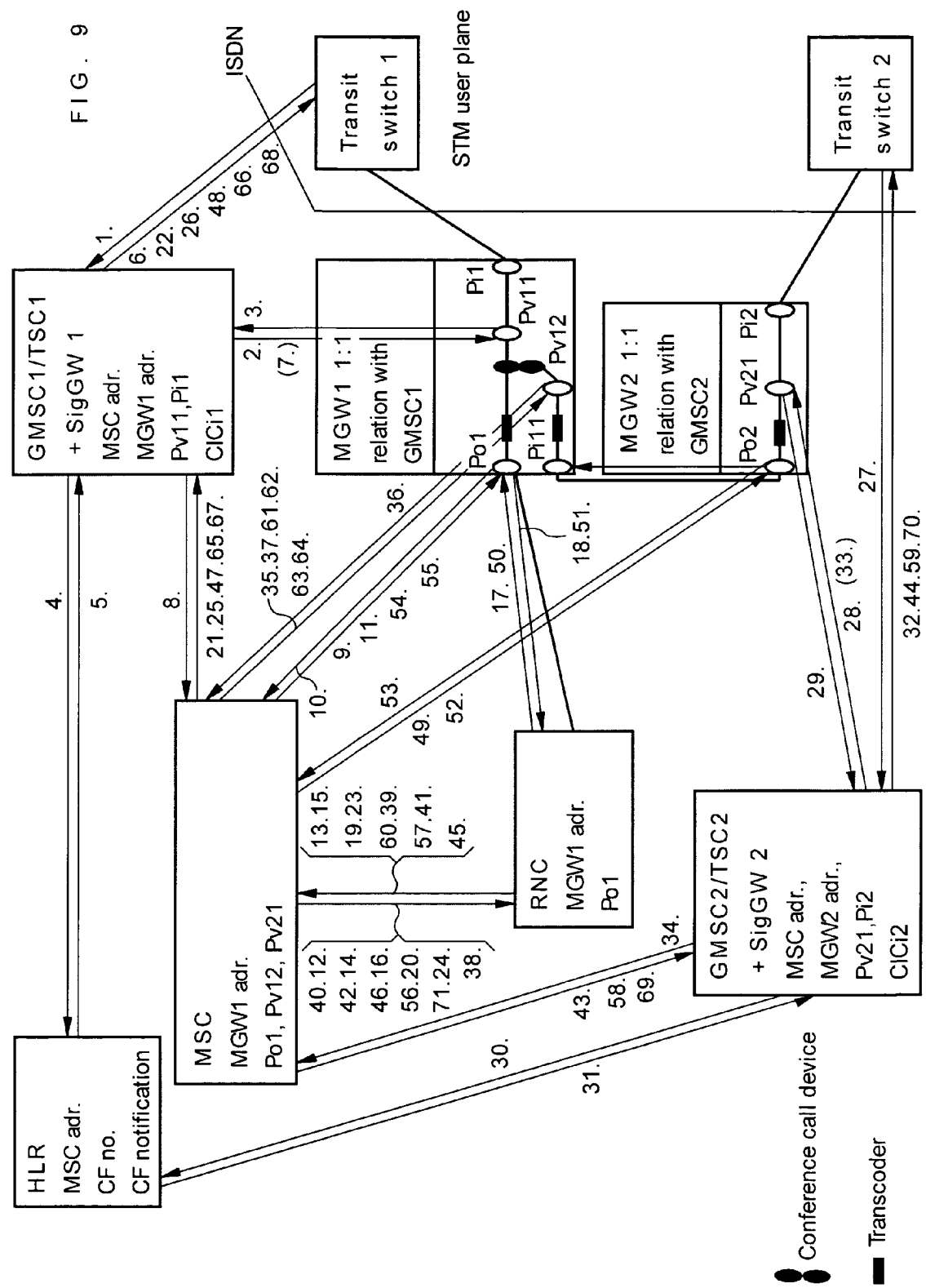
FIG. 9 is a block diagram illustrating basic call setup for a MPTY call, MGW address being transported in the forward direction.

33. Optional DCP, Through connect (Pi2, Pv21)
    The GMSC2 commands the MGW2 to through connect the incoming point Pi2 and the virtual point Pv21. Optionally, the whole MGW2 connection can be through connected with one DCP, Through connect (Pi2, Po2) message.
34. ISDN, Initial Address Message IAM (MGW2, Pv21, OPC, DPC, CIC)
    The IAM message is sent from the GMSC2 to the MSC. The MGW2 address and Pv21 or optionally the OPC, DPC, CIC can be used for identifying the incoming connection in the MSC.
35. DCP, resource request (MGW1)
    Resources are requested for incoming AAL2 connection.
36. DCP, resource response (Pv12, Pi11)
    An incoming point Pi11 is returned from the MGW1.
37. Optional DCP, Through connect (Pv12, Pi11)
    The MSC commands the MGW1 to through connect the virtual point Pv12 and the incoming point Pi11. Optionally, the whole MGW1 connection can be through connected with one DCP, Through connect (Pi11, Po2) message.
38. RANAP, Paging
39. DTAP, Paging Response
40. DTAP, Setup
41. DTAP, Call confirmed
42. DTAP, Alert
43. ISDN, Address Complete Message ACM
44. ISDN, Call Proceeding CPG
45. DTAP, HOLD (B)
46. DTAP, HOLD ACK
47. ISUP, Call Proceeding Message CPG (B held)
48. ISUP, Call Proceeding Message CPG (B held)
49. DCP, Setup connection (MGW1, MGW2, Pv21, Pi11)
    MSC requests resources for an outgoing AAL2 connection and commands the MGW1 to set up a connection towards Pi11 in MGW 1.
50. AAL2, Establish Request
51. AAL2, Establish confirm
52. DCP, Setup connection response (Po2)
    The MGW2 signals back that the outgoing connection has been set up and returns an outgoing point Po2.
53. DCP, Through connect (Pv21, Po2)
    The MSC commands the MGW2 to through connect the virtual point Pv21 and the outgoing point Po2. Optionally, the whole MGW2 connection can be through connected with one DCP, Through connect (Pi2, Po2) message.
54. DCP, Disconnect (Po1, Pv11)
55. DCP, Through connect (Pv12, Po2)
    The MSC commands the MGW1 to through connect the virtual point Pv12 and the outgoing point Po2. Optionally, the whole MGW2 connection can be through connected with one DCP, Through connect (Pi2, Po2) message. This connects the existing user plane between RNC and MGW1 with the user plane of subscriber C.
56. DTAP, Connect
57. DTAP, Connect ack
58. ISUP, Answer Message ANM
59. ISUP, Answer Message ANM FIG. 9 illustrates a MPTY call. The MGW address is transported in the forward direction.

Here a subscriber B is calling a served UE A, who has the supplementary services CW, HOLD and MPTY. After the call from B to A is active another terminating call from a subscriber C over MGW2 to A is received. Subscriber A accepts the waiting call from C and therefore has to put the call to B on hold. The user plane of the second call is routed from MGW2 to the MGW1 of the first active call. Then MSC commands MGW1 to switch from the former active call to the waiting call. The active call becomes then the held call. It is assumed that both the active and the waiting call use the same service, e.g., speech, so that the AAL2 connection between RNC and MGW1 can be reused. Now a multiparty is invoked by subscriber A. Therefore the MSC links in a conference call device (CCD). Before the user planes can be connected, the user planes all must be in the same format, e.g., PCM 64 kbit/s.

In this case only one MGW is used for each call, which can be used by all control servers to influence the user plane. The user plane connections are gathered at one MGW. This allows faster switches between the calls from B and C.

A transcoder is linked in by the terminating MSC for each call. On the incoming side, e.g., PCM coding is used and on the outgoing side the coding, negotiated with the UEs, is used. The linked in conference bridge is assumed to be a PCM conference bridge, therefore at each leg coding from the received coding to PCM coding applies. This allows gathering of different coded data streams.

1. ISDN, Initial Address Message IAM (OPC, DPC, CIC)
   Call setup is requested from an external ISDN network for a mobile terminated call attempt. In this example the GMSC1/TSC and the Signaling Gateway 1 are collocated.
2. DCP, resource request (MGW1, CIC)
   Resources are requested for the call identified by its CIC, which were chosen by the transit switch of the ISDN network.
3. DCP, resource response (Pi1, Pv11)
   An incoming point Pi1 and a virtual point Pv11 are returned from the MGW1.
4. MAP, SendRouting Information request
   The GMSC1 interrogates the HLR for routing information.
5. MAP, SendRouting Information response
   The GMSC1 receives the MSC address.
6. ISDN, Address Complete Message ACM
   The ACM message is send from the GMSC1/TSC to the transit switch 1.
7. Optional DCP, Through connect (Pi1, Pv11)
   The GMSC1/TSC commands the MGW1 to through connect the incoming point Pi1 and the virtual point Pv11. Optionally, the whole MGW1 connection can be through connected with one DCP, Through connect (Pi1, Po1) message.
8. ISDN, Initial Address Message IAM (MGW1, Pv11, OPC, DPC, CIC)
   The IAM message is sent from the GMSC1/TSC to the MSC. The MGW1 address and Pv11 or optionally the OPC, DPC, CIC can be used for identifying the incoming connection in the MSC.
9. DCP, resource request (MGW1, Pv11)
   Resources are requested for the call identified by its CIC.
10. DCP, resource response (Po1)
    An outgoing point Po1 is returned from the MGW1.
11. DCP, Through connect (Pv11, Po1)
    The MSC commands the MGW1 to link in a transcoder and to through connect the virtual point Pv1 and the outgoing point Po1. Optionally, the whole MGW1 connection can be through connected with one DCP, Through connect (Pi1, Po1) message.

Figure 10:
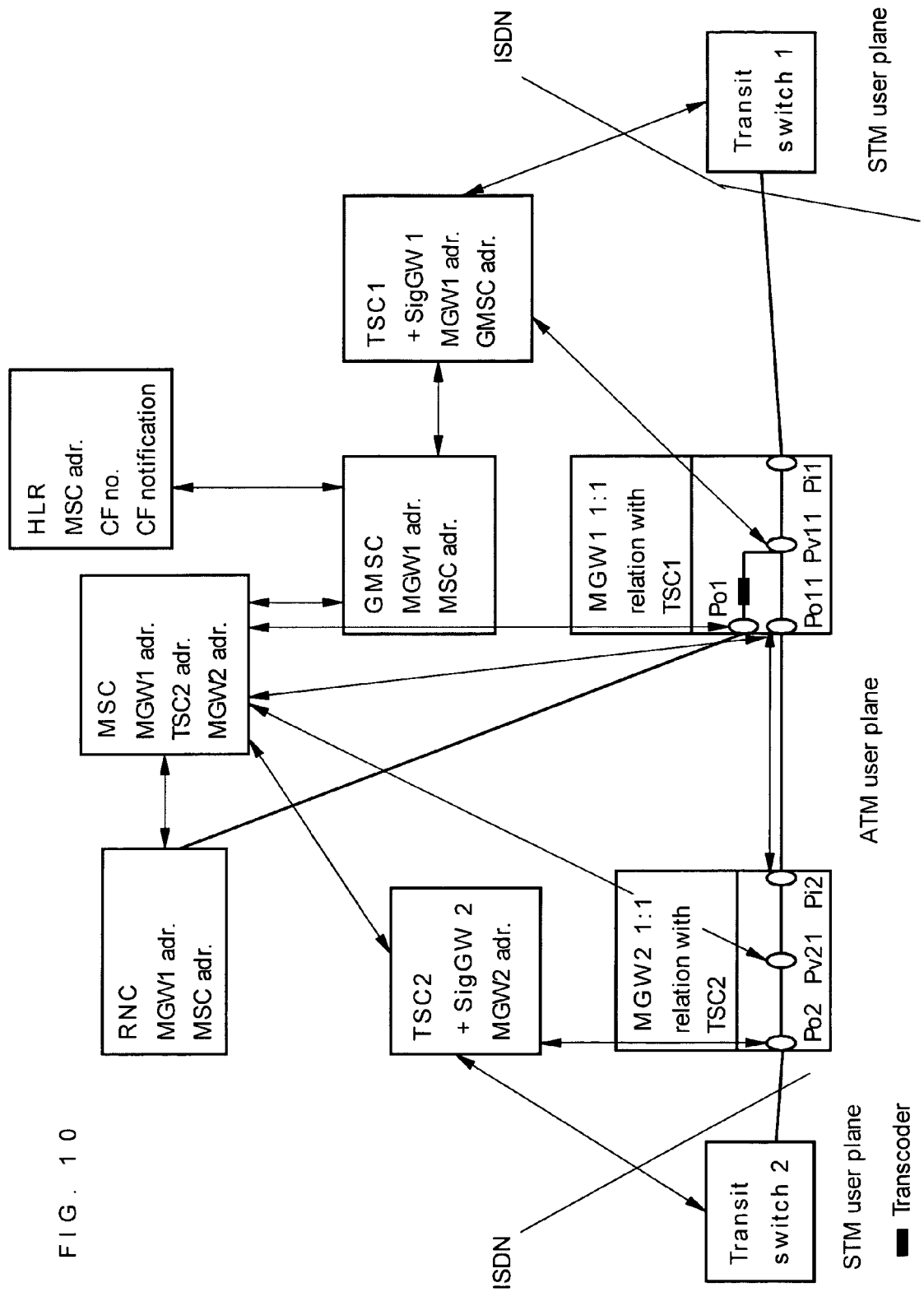
FIG. 10 is a block diagram illustrating basic call setup for call forwarding in MSC to an ISDN number, The MSC setting the connection between MGW1 And MGW2.

12. RANAP, Paging
13. DTAP, Paging Response
14. DTAP, Setup
15. DTAP, Call confirmed
16. RANAP, Assignment Request
17. AAL2, Establish Request
18. AAL2, Establish confirm
19. RANAP, Assignment Response
20. DTAP, Alert
21. ISDN, Address Complete Message ACM
22. ISDN, Call Proceeding CPG
23. DTAP, Connect
24. DTAP, Connect ack
25. ISUP, Answer Message ANM
26. ISUP, Answer Message ANM
27. ISDN, Initial Address Message IAM (OPC, DPC, CIC)
    Call setup is requested from an external ISDN network for a mobile terminated call attempt. In this example the GMSC2 and the Signaling Gateway 2 are collocated.
28. DCP, resource request (MGW2, CIC)
    Resources are requested for the call identified by its CIC, which were chosen by the transit switch 2 of the ISDN network.
29. DCP, resource response (Pi2, Pv11)
    An incoming point Pi2 and a virtual point Pv21 are returned from the MGW2.
30. MAP, SendRouting Information request
    The GMSC2 interrogates the HLR for routing information.
31. MAP, SendRouting Information response
    The GMSC2 receives the MSC address.
32. ISDN, Address Complete Message ACM
    The ACM message is send from the GMSC2 to the transit switch 2.
33. Optional DCP, Through connect (Pi2, Pv21)
    The GMSC2 commands the MGW2 to through connect the incoming point Pi2 and the virtual point Pv21. Optionally, the whole MGW2 connection can be through connected with one DCP, Through connect (Pi2, Po2) message.
34. ISDN, Initial Address Message IAM (MGW2, Pv21, OPC, DPC, CIC)
    The IAM message is sent from the GMSC2 to the MSC. The MGW2 address and Pv21 or optional the OPC, DPC, CIC can be used for identifying the incoming connection in the MSC.
35. DCP, resource request (MGW1)
    Resources are requested for incoming AAL2 connection.
36. DCP, resource response (Pv12, Pi11)
    An incoming point Pi11 is returned from the MGW1.
37. Optional DCP, Through connect (Pv12, Pi11)
    The MSC commands the MGW1 to through connect the virtual point Pv12 and the incoming point Pi11. Optionally, the whole MGW1 connection can be through connected with one DCP, Through connect (Pi11, Po2) message.
38. RANAP, Paging
39. DTAP, Paging Response
40. DTAP, Setup
41. DTAP, Call confirmed
42. DTAP, Alert
43. ISDN, Address Complete Message ACM
44. ISDN, Call Proceeding CPG
45. DTAP, HOLD (B)
46. DTAP, HOLD ACK
47. ISUP, Call Proceeding Message CPG (B held)
48. ISUP, Call Proceeding Message CPG (B held)
49. DCP, Setup connection (MGW1, MGW2, Pv21, Pi11)
    MSC requests resources for an outgoing AAL2 connection, links in a transcoder and commands the MGW2 to set up a connection towards Pi11 in MGW1.
50. AAL2, Establish Request
51. AAL2, Establish confirm
52. DCP, Setup connection response (Po2)
    The MGW2 signals back that the outgoing connection has been set up and returns an outgoing point Po2.
53. DCP, Through connect (Pv21, Po2)
    The MSC commands the MGW2 to through connect the virtual point Pv21 and the outgoing point Po2. Optional the whole MGW2 connection can be through connected with one DCP, Through connect (Pi2, Po2) message.
54. DCP, Disconnect (Po2, Pv22)
55. DCP, Through connect (Pv12, Po2)
    The MSC commands the MGW1 to through connect the virtual point Pv12 and the outgoing point Po2. Optionally, the whole MGW2 connection can be through connected with one DCP, Through connect (Pi2, Po2) message. This connects the existing user plane between the RNC and MGW1 with the user plane of subscriber C.
56. DTAP, Connect
57. DTAP, Connect ack
58. ISUP, Answer Message ANM
59. ISUP, Answer Message ANM
60. DTAP, Build Multiparty
61. DCP, Link in CCD (MGW1, Po11, Pv11)
    A PCM 64 kbit/s CCD is linked in the path where the user plane is 64 kbit/s.
62. DCP, Disconnect (Po1, Pv12)
63. DCP, Link in transcoder (MGW1, Pi11, Pv12)
    To convert speech to PCM.
64. DCP, Through connect (Pv12)
    Through connect Pv12 and conference bridge.
65. ISUP, Call Proceeding CPG (Retrieve)
66. ISUP, Call Proceeding CPG (Retrieve)
67. ISUP, Call Proceeding CPG (MPTY)
68. ISUP, Call Proceeding CPG (MPTY)
69. ISUP, Call Proceeding CPG (MPTY)
70. DTAP, Build MPTY ack FIG. 10 illustrates call forwarding in the MSC to an ISDN subscriber identified by an ISDN no. The MSC sets up the connection between MGW1 and MGW2.

In this scenario a subscriber A has set up a call over the ISUP to a UE B. For this purpose the TSC1 has set up the context between the terminations Pi1 and Pv11 in MGW1 and the MSC has set up the context including a transcoder between the terminations Po1 and Pv11. An assignment request has been sent over the Iu interface, which has set up the user plane between the UE and the MGW1. The MSC deducts the TSC2 address and the MGW2 address out of the forwarded to number. Then the MSC forwards the user plane from MGW1 to MGW2.

Figure 11:
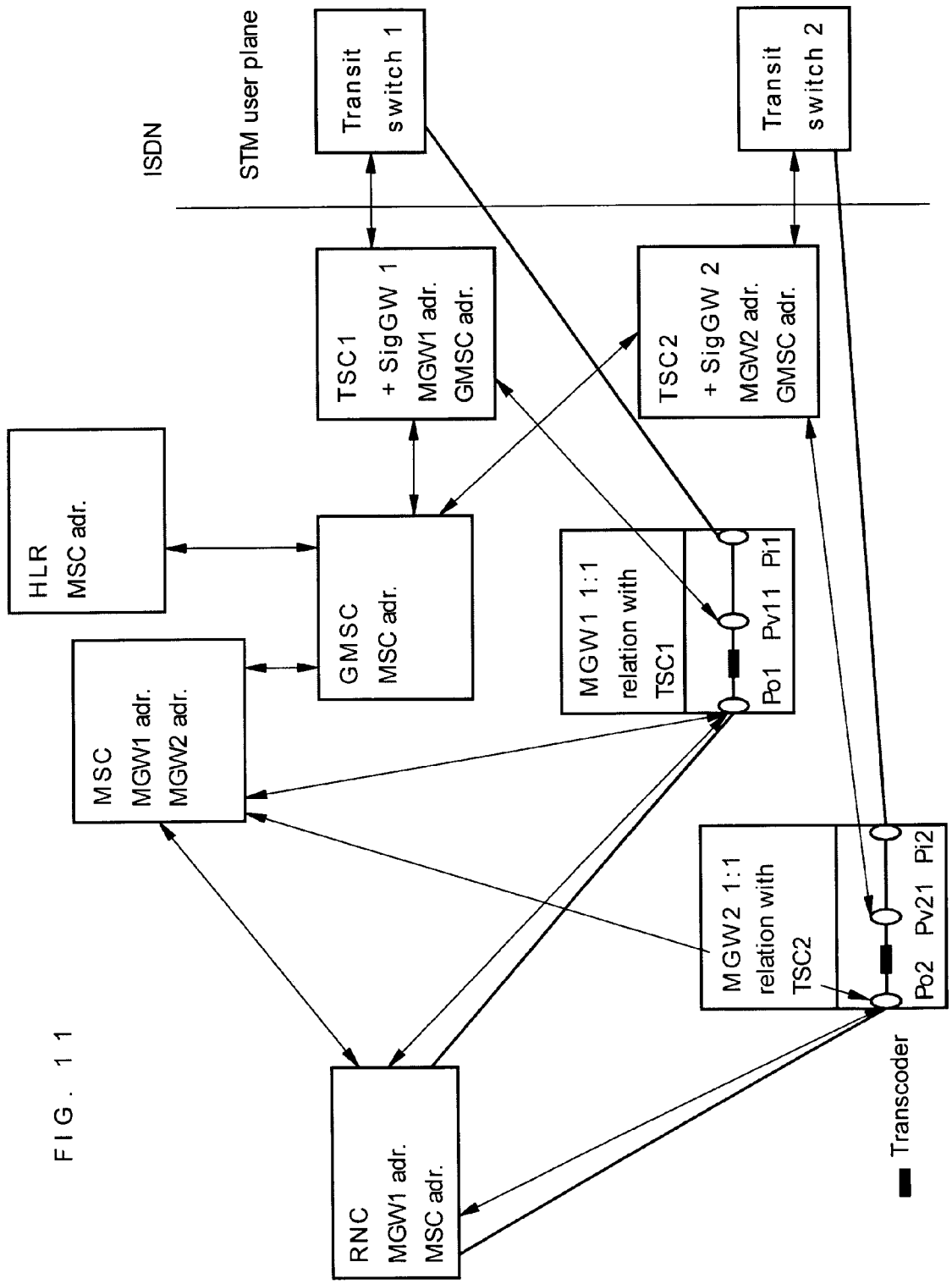
FIG. 11 is a block diagram illustrating basic call setup for call waiting and hold.

FIG. 11 illustrates an example involving the CW and HOLD functions. In this scenario, a subscriber A has set up a call over ISUP to a UE B. For this purpose the TSC1 has set up the context between the terminations Pi1 and Pv11 in MGW1 and the MSC has set up the context including a transcoder between the terminations Po1 and Pv11. An assignment request has been sent over the Iu interface, which has set up the user plane between the UE and the MGW1. Then a subscriber C sets up a call over ISUP to UE B. For this purpose the TSC2 has set up the context between the terminations Pi2 and Pv21 in MGW2. If the active call is to be put on hold, the user plane has to be disconnected at MGW1. If the waiting call is to be accepted the MSC sets up the context including a transcoder between the terminations Po2 and Pv21 in MGW2.

Figure 12:
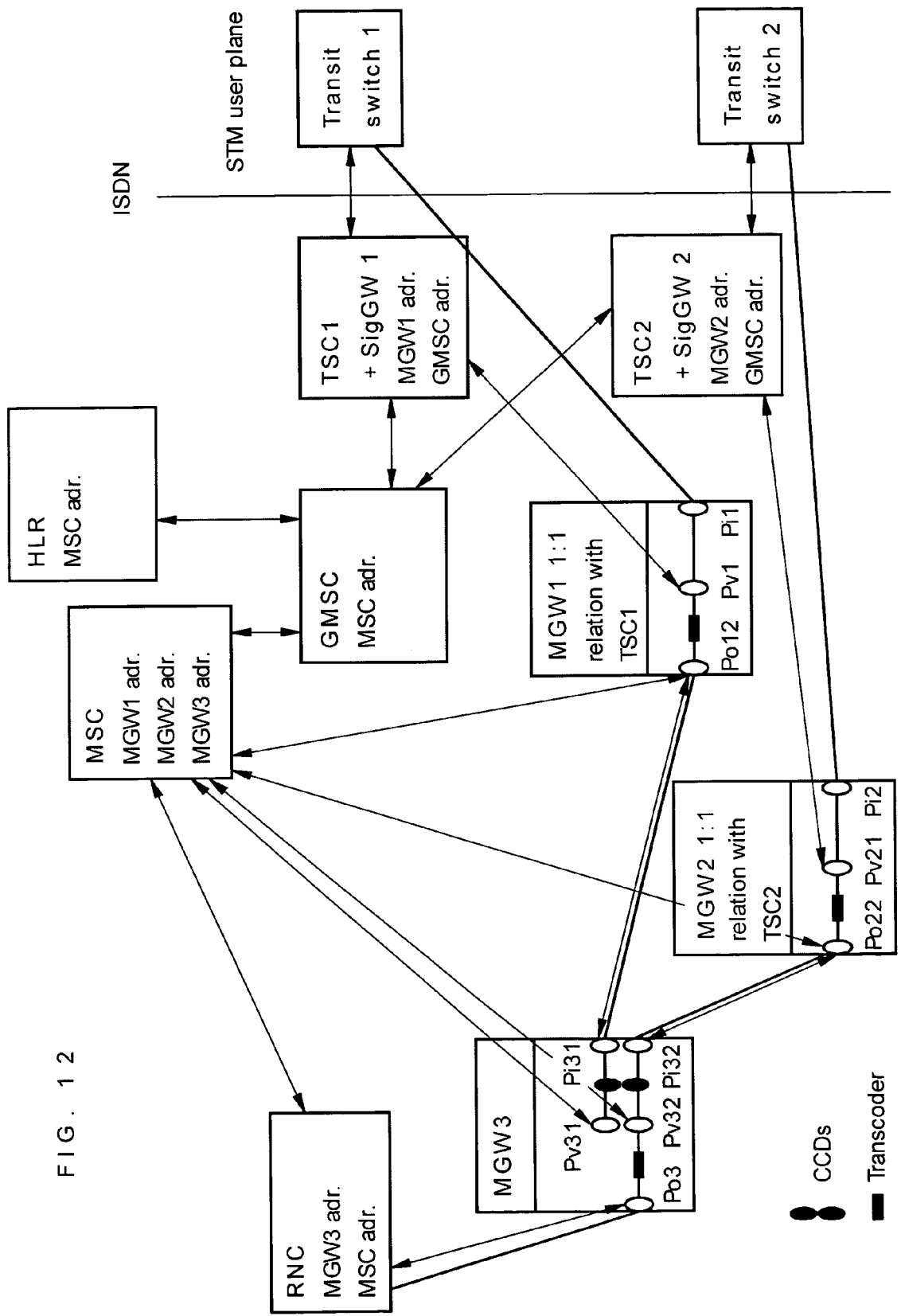
FIG. 12 is a block diagram illustrating basic call setup for a MPTY call with CCDs only in MGW3.

FIG. 12 illustrates MPTY calls, using CCDs only in MGW3. In this scenario, a subscriber A has set up a call over ISUP to a UE B. Then a subscriber C has set up a call over ISUP to UE B. The UE B has accepted the waiting call from subscriber C and put the active call on hold. If a built MPTY message is received from the UE, then the MSC selects an MGW with CCD capabilities. The capabilities are requested by the MSC, whenever a new MGW is introduced to the MSC server or when a previously introduced MGW comes back into service again. The MGW selection is done according to the following priorities: an MGW with the active call on (this saves a subsequent setup from RNC towards the MGW); an MGW with the call on hold call; or any MGW with CCD capabilities, chosen depending on the current load situation.

The above described examples illustrate the new approach to separation of call control and bearer control for implementation of GSM and UMTS core networks. This implementation provides the features summarized above and set forth in the following claims.

What is claimed is:

1. A method of setting up a call in a wireless communication network comprising:
   receiving a service request for a call at one of a plurality of control nodes in the wireless communication network, wherein the network is a Narrowband Integrated Services Digital Network (N-ISDN) and call control and bearer control are separated, the call being intended for a select destination:
   selecting at least one media gateway to switch a user plane for handling the call depending on one of origin of the call, destination of the call and required service of the call, the at least one MGW including plural logical points for connecting plural MGW resources for handling the user plane of the call, the at least one MGW being adapted to identify one of the logical points to one of the control nodes in response to a request for resources from the one of the plurality of control nodes;
   reserving a logical point in said at least one media gateway and
   communicating with the media gateway to setup bearer control for the call.

2. The method of claim 1 wherein the call is from a mobile terminal in the network to a mobile terminal in the network and the selecting step comprises a single media gateway for handling the call.

3. The method of claim 1 wherein the call is from external to the network to a mobile terminal in the network and the selecting step comprises selecting a single media gateway for handling the call.

4. The method of claim 1 wherein the call is from external to the network and the select destination is external to the network and the selecting step comprises selecting a first media gateway and a second media gateway for handling the call.

5. The method of claim 1 wherein the media gateway is selected from among a plurality of media gateways dependent on media gateway capabilities required for handling the call control node.

6. The method of claim 1 wherein the media gateway is selected from among a plurality of media gateways dependent on a selected destination for the call.

7. The method of claim 1 wherein the call is from a mobile terminal in the network to external to the network and the selecting step comprises selecting a single media gateway for handling the call.

8. The method of claim 1 wherein the selecting step comprises selecting a group of MGWs according to the select destination of the call and the at least one MGW is selected from the group of MGWs according to capabilities of the at least one MGW.

9. The method of claim 8 wherein the at least one MGW Is further selected based on traffic load of the at least one MGW.

10. The method of claim 1 wherein an MPTY call is established by selecting an MGW preferring the MGW serving the active call, and if said MGW serving the active call cannot be used, the MGW serving the held call, and if the MGW serving the held call cannot be used, an MGW with MPTY capabilities selected based on traffic conditions.

11. A method of setting up a call in a wireless communication network comprising:
   a) initiating call setup over one control node, the one control node determining a media gateway (MGW) for routing a user plane of the call, wherein the determination of the MGW is made depending on one of: origin of the call, destination of the call and required service of the call, the MGW Including plural logical points for connecting plural MGW resources for handling the user plane of the call the MGW being adapted to identify one of the logical points to one of the control nodes in response to a request for resources from the one of the plurality of control nodes;
   b) the one control node requesting resources from the MGW for handling the call and reserving a logical point in the media gateway;
   c) the one control node transferring an address for the MGW in a forward direction to a further control node; and
   (d) the further control node implementing steps b) and c) until either a call destination or an external network is reached, the call being carried through the wireless communications network, wherein the wireless communications network is a Narrowband Integrated Services Digital Network (N-ISDN) whereby call control is implemented in the control nodes and bearer control is implemented in the MGW.

12. The method of claim 11 wherein the one control node selects the MGW for handling the bearer control of the call.

13. The method of claim 11 wherein the further control node is a gateway MSC.

14. The method of claim 11 wherein the further control nodes are a gateway MSC and a second MSC.

15. The method of claim 11 wherein the one control node is a Transit Switching Center.

16. The method of claim 11 wherein the MGW reserves a logical point identifying reserved resources in the MGW for handling the call in response to a request for resources.

17. The method of claim 16 wherein the step c), the one control node transferring an address for the MGW in a forward direction to a further control node, further comprises transferring an identification of the logical point in the forward direction to the further control node.

18. A wireless communication network comprising:
   a plurality of control nodes, the control nodes receiving information about a call, the control nodes requesting resources from at least one media gateway (MGW) for handling a user plane of the call, wherein the wireless communication network is a Narrowband Integrated Services Digital Network (N-ISDN) and the selection of the at least one MGW depends on one of origin of the call, destination of the call or required service of the call; and the at least one MGW including plural logical points for connecting plural MGW resources for handling the user plane of the call, the at least one MGW being adapted to identify one of the logical points to one of the control nodes in response to a request for resources from the one of the control nodes, whereby the plurality of control nodes use the at least one MGW for handling the user plane of the call.

19. The wireless communication network of claim 18 wherein at least one of the plural MGW resources is one of a transcoder, a conference call device, a modem, a tone generator, a framing device or an announcement device.

20. The wireless communication network of claim 18 wherein the communication between control nodes and the at least one MGW regarding the control and reservation of resources in said at least one MGW is performed using a Device Control Protocol.

21. The wireless communication network of claim 20 wherein the Device Control Protocol is H.GCP.

22. The wireless communication network of claim 18 wherein the control nodes request resources from one of the MGWs in response to the information being a service request for the call.

23. The wireless communication network of claim 22 wherein each MGW includes plural logical points for connecting plural MGW resources for handling the call, the MGW being adapted to identify one of the logical points to one of the control nodes in response to a request for resources from the one of the control nodes.

24. The wireless communication network of claim 23 wherein the identified logical point identifies a reserved resource and is returned to the control server using H.GCP.

25. The wireless communication network of claim 18 wherein the network uses an N-ISUP Interface between the control nodes for call control signaling.

26. The wireless communication network of claim 18 wherein the user plane is transferred compressed within and between MGWs.

27. A wireless communication network comprising:

at least one media gateway (MGW), each MGW being adapted for routing a user plane of a call and each MGW including MGW resources for handling the call, the at least one media gateway including a plurality of logical points for connecting plural MGW resources for handling the user plane of the call and the MGW being adapted to identify one of the logical points in response to a request from one of at least one control nodes, wherein the wireless communication network is a Narrowband Integrated Services Digital Network (N-ISDN); and the at least one control node adapted for implementing application logic for call control and for reserving at least one of the plurality of local points in the MGW for handling the user plane, the application logic requesting MGW resources from the at least one MGW for handling a call to allow pooling of MGW resources under control of the application logic, wherein the at least one MGW is selected by the at least one control node utilizing at least one of: call origin, call destination, required service of the call or framing of the call.

28. The wireless communication network of claim 27 further comprising an interface for signaling for MGW control between the at least one MGW and the at least one control node.

* * * * *

UNITED STATES PATENT AND TRADEMARK OFFICE
CERTIFICATE OF CORRECTION

PATENT NO. : 6,947,747 B1
APPLICATION NO. : 09/607790
DATED : September 20, 2005
INVENTOR(S) : Martin Stumpert It is certified that error appears in the above-identified patent and that said Letters Patent is hereby corrected as shown below:

In Column 4, Line 20, delete "P Internet Protocol" and insert -- IP Internet Protocol --, therefor.

In Column 6, Line 31, delete "MSC 1" and insert -- MSC1 --, therefor.

In Column 8, Line 61, delete "PV11" and insert -- Pv11 --, therefor.

In Column 8, Line 65, delete "PV11" and insert -- Pv11 --, therefor.

In Column 10, Line 34, delete "PV11" and insert -- Pv11 --, therefor.

In Column 11, Line 31, delete "MSC 1" and insert -- MSC1 --, therefor.

In Column 11, Line 45, delete "RNC 1" and insert -- RNC1 --, therefor.

In Column 12, Line 44, delete "MGW 1" and insert -- MGW1 --, therefor.

In Column 15, Line 53, delete "MGW 1" and insert -- MGW1 --, therefor.

In Column 17, Line 67, delete "MGW 1" and insert -- MGW1 --, therefor.

In Column 18, Line 25, delete "MGW 1" and insert -- MGW1 --, therefor.

In Column 24, Line 14, in Claim 9, delete "Is" and insert -- is --, therefor.

UNITED STATES PATENT AND TRADEMARK OFFICE
CERTIFICATE OF CORRECTION

PATENT NO. : 6,947,747 B1
APPLICATION NO. : 09/607790
DATED : September 20, 2005
INVENTOR(S) : Martin Stumpert It is certified that error appears in the above-identified patent and that said Letters Patent is hereby corrected as shown below:

In Column 24, Line 29, in Claim 11, delete "Including" and insert -- including --, therefor.

Signed and Sealed this

Twentieth Day of November, 2007

JON W. DUDAS
*Director of the United States Patent and Trademark Office*